(12) United States Patent
Kazuno et al.

(10) Patent No.: US 8,795,861 B2
(45) Date of Patent: Aug. 5, 2014

(54) FUEL CELL SYSTEM AND VEHICLE EQUIPPED WITH THE SAME

(75) Inventors: Shuichi Kazuno, Utsunomiya (JP); Hibiki Saeki, Utsunomiya (JP); Kazunori Watanabe, Mooka (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/493,360

(22) Filed: Jun. 11, 2012

(65) Prior Publication Data

US 2012/0321917 A1    Dec. 20, 2012

(30) Foreign Application Priority Data

Jun. 20, 2011    (JP) .................... 2011-135905

(51) Int. Cl.
*H01M 12/00* (2006.01)

(52) U.S. Cl.
USPC .................. 429/9; 429/430; 307/46

(58) Field of Classification Search
None
See application file for complete search history.

(56) References Cited

U.S. PATENT DOCUMENTS

| | | | |
|---|---|---|---|
| 7,436,148 B2 | 10/2008 | Saeki et al. | |
| 8,088,527 B2 | 1/2012 | Manabe et al. | |
| 8,435,686 B2 | 5/2013 | Miyata et al. | |
| 2003/0194586 A1 | 10/2003 | Sugiura et al. | |
| 2004/0065489 A1 | 4/2004 | Aberle et al. | |
| 2009/0029197 A1 | 1/2009 | Hibino et al. | |
| 2009/0068514 A1 | 3/2009 | Aso et al. | |
| 2010/0055521 A1 | 3/2010 | Umayahara et al. | |
| 2011/0033762 A1 | 2/2011 | Yoshida | |

FOREIGN PATENT DOCUMENTS

| | | |
|---|---|---|
| CN | 101323262 A | 12/2008 |
| CN | 101569044 A | 10/2009 |
| DE | 102 23 117 A1 | 12/2003 |
| DE | 103 16 833 B4 | 9/2005 |
| DE | 10 2005 002 506 A1 | 7/2006 |
| DE | 11 2006 003 357 T5 | 10/2008 |
| EP | 2 131 428 B1 | 10/2011 |
| JP | 2005-348530 A | 12/2005 |
| JP | 2007-005038 A | 1/2007 |
| JP | 2008-226591 A | 9/2008 |
| JP | 2008-300299 A | 12/2008 |
| JP | 2009-151997 A | 7/2009 |
| WO | 2005/004261 A2 | 1/2005 |

OTHER PUBLICATIONS

U.S. Appl. No. 13/409,757, filed Mar. 2012, Kazuno et al.*

(Continued)

*Primary Examiner* — Milton I Cano
*Assistant Examiner* — Carmen Lyles-Irving
(74) *Attorney, Agent, or Firm* — Westerman, Hattori, Daniels & Adrian, LLP

(57) ABSTRACT

A fuel cell system and a fuel cell vehicle equipped with the fuel cell system are provided. In a case where the voltage of a battery is outside a voltage range of fuel cells where oxidation-reduction proceeds, an ECU controls a DC/DC converter to be placed in a direct connection state (Vbat≈Vfc), and controls a gas supply unit so as to regulate concentration of oxygen or hydrogen supplied to the fuel cells in accordance with a target power generation electric power determined based on electric power required by a load.

7 Claims, 29 Drawing Sheets

(56) References Cited

OTHER PUBLICATIONS

Office Action dated Jul. 16, 2013, issued in corresponding Japanese application No. 2011-135905, w/English translation.
Japanese Office Action dated Apr. 16, 2013 (mailing date), issued in corresponding Japanese Patent Application No. 2011-135905.
German Search Report dated Apr. 5, 2013, issued in corresponding German Patent Application No. 1020122103503, w/ English translation.
German Office Action dated Apr. 5, 2013, issued in corresponding German Patent Application No. 1020122103503, w/English translation.

* cited by examiner

FUEL CELL SYSTEM AND VEHICLE EQUIPPED WITH THE SAME

CROSS-REFERENCE TO RELATED APPLICATION

This application is based upon and claims the benefit of priority from Japanese Patent Application No. 2011-135905 filed on Jun. 20, 2011, of which the contents are incorporated herein by reference.

BACKGROUND OF THE INVENTION

1. Field of the Invention

The present invention relates to a fuel cell system including a voltage regulator and an energy storage device which are connected in series to each other, a fuel cell connected in parallel to the serially connected voltage regulator and energy storage device, and a load driven by a combined power source of the energy storage device and the fuel cell. Further, the present invention relates to a vehicle equipped with such a fuel cell system. Such a fuel cell system and such a vehicle equipped with the fuel cell system make it possible to suppress degradation of the fuel cell, and improve the system efficiency.

2. Description of the Related Art

A fuel cell employs a membrane electrode assembly (MEA) which includes an anode, a cathode, and a solid polymer electrolyte membrane interposed between the anode and the cathode. The solid polymer electrolyte membrane is formed by impregnating a thin membrane of perfluorosulfonic acid with water, for example. Each of the cathode and the anode has a gas diffusion layer such as a carbon paper, and an electrode catalyst layer of catalyst particles of platinum alloy or the like (hereinafter also referred to as the Pt catalyst) supported on porous carbon particles. The carbon particles are deposited uniformly on the surface of the gas diffusion layer. The electrode catalyst layer of the anode and the electrode catalyst layer of the cathode are fixed to both surfaces of the solid polymer electrolyte membrane, respectively.

A technique of suppressing degradation of the fuel cell is proposed in JP 2007-005038 A. In the technique proposed in JP 2007-005038 A, power generation of the fuel cell is performed such that an oxidation reduction electric potential where sintering phenomenon of the Pt catalyst (aggregation of the Pt catalyst) occurs is avoided.

SUMMARY OF THE INVENTION

In the technique according to JP 2007-005038 A, in order to continuously avoid the oxidation reduction electric potential, it is required to increase or decrease electric power outputted from the fuel cell relative to electric power required by load such as a traction motor driven by the electric power generated in the fuel cell. In this case, with excessive electric power generated in the fuel cell, a battery (energy storage device) is charged by stepping down the voltage through chopping operation of a DC/DC converter. If electric power generated by the fuel cell is not sufficient for electric power required by the load, the voltage of the battery is stepped up by chopping operation of the DC/DC converter to provide assistance by the battery (to compensate for the shortage of electric power by the fuel cell).

However, in the technique according to JP 2007-005038 A, in order to continuously avoid the oxidation reduction electric potential, chopping operation of the DC/DC converter occurs frequently, and the switching loss of the DC/DC converter is large. Therefore, the system efficiency of the fuel cell system is low disadvantageously.

The present invention has been made taking the problem of this type into account, and an object of the present invention is to provide a fuel cell system and a vehicle equipped with the fuel cell system which make it possible to prevent degradation of a fuel cell, and improve the system efficiency of the fuel cell system.

A fuel cell system according to the present invention includes a fuel cell having catalyst, for performing power generation by inducing reaction of oxygen or hydrogen at the catalyst, a gas supply unit for supplying at least one of the oxygen and the hydrogen to the fuel cell, an energy storage device in which an output voltage thereof changes depending on an amount of electric power stored in the energy storage device, a voltage regulator provided in parallel to the fuel cell, and in series with the energy storage device for regulating an output voltage of the fuel cell, a load driven by electric power outputted from the fuel cell, and a control unit for detecting electric power required by the load and controlling the fuel cell, the gas supply unit, and the voltage regulator. In a case where the output voltage of the energy storage device is outside a voltage range of the fuel cell where oxidation-reduction proceeds, the control unit controls the voltage regulator to be placed in a direct connection state, and controls the gas supply unit so as to regulate concentration of the oxygen or the hydrogen supplied to the fuel cell in accordance with a target power generation electric power determined based on the electric power required by the load.

In the present invention, in the case where the output voltage of the energy storage device is outside a voltage range of the fuel cell where oxidation-reduction proceeds, the control unit controls the voltage regulator to be placed in the direct connection state (output voltage of the energy storage device≈output voltage of the fuel cell), not in a voltage step-up/step-down state where a voltage step-up/step-down operation is performed, and controls the gas supply unit so as to regulate concentration of the oxygen or the hydrogen supplied to the fuel cell in accordance with a target electric power for the power generation determined based on the electric power required by the load. Therefore, degradation of the fuel cell is prevented, and power loss related to the voltage step-up/step-down operation of the voltage regulator is reduced.

The above case where the output voltage of the energy storage device is outside the voltage range of the fuel cell where oxidation-reduction proceeds means any of the following cases (1) and (2):

(1) The output voltage is within a voltage range where reduction of the catalyst proceeds stably, below the voltage range of the fuel cell where oxidation-reduction proceeds; or (2) The output voltage is within a voltage range where oxidation of the catalyst proceeds stably, above the voltage range of the fuel cell where oxidation-reduction proceeds.

Further, preferably, the fuel cell system includes an outside temperature sensor for measuring an outside temperature, and if the outside temperature measured by the outside temperature sensor is a threshold temperature or more, the control unit controls the voltage regulator to be placed in the direct connection state, i.e., the energy storage device and the fuel cell are controlled to be placed in the direct connection state, at a voltage within the voltage range where reduction of the catalyst proceeds stably. If the outside temperature is lower than the threshold temperature, energy may be required, e.g., for warming up the fuel cell system at the time of restarting operation of the fuel cell system. In this case, the voltage of the energy storage device is kept high without implementing the direct connection control. In this manner, sufficient electric power can be secured.

Moreover, when the electric power required by the load is high, the control unit regulates the output voltage of the fuel cell by the voltage regulator to supply electric power from the fuel cell and the energy storage device to the load, and when the electric power required by the load is low, the control unit controls the voltage regulator to be placed in the direct connection state to cover the electric power required by the load mainly by the electric power from the fuel cell. For example, assuming that the fuel cell system is mounted in a vehicle, the state where electric power required by the load is high indicates a state where the vehicle equipped with the fuel cell system is in the middle of hill climbing or the like.

Further, at the time of controlling the voltage regulator to be placed in the direct connection state, the control unit controls the target SOC value of the energy storage device to a threshold SOC value or less. The threshold SOC value corresponds to the lower limit voltage of the voltage range of the fuel cell where oxidation-reduction proceeds. In this manner, it is possible to place the energy storage device and the fuel cell in the direct connection state more frequently.

According to the present invention, there is also provided a vehicle equipped with the above-mentioned fuel cell system.

In the present invention, in the case where the output voltage of the energy storage device is outside a voltage range of the fuel cell where oxidation-reduction proceeds, the control unit controls the voltage regulator to be placed in the direct connection state, and controls the gas supply unit so as to regulate concentration of the oxygen or the hydrogen supplied to the fuel cell in accordance with a target power generation electric power determined based on electric power required by the load. Thus, it becomes possible to suppress degradation of the fuel cell, and improve the system efficiency of the fuel cell system.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
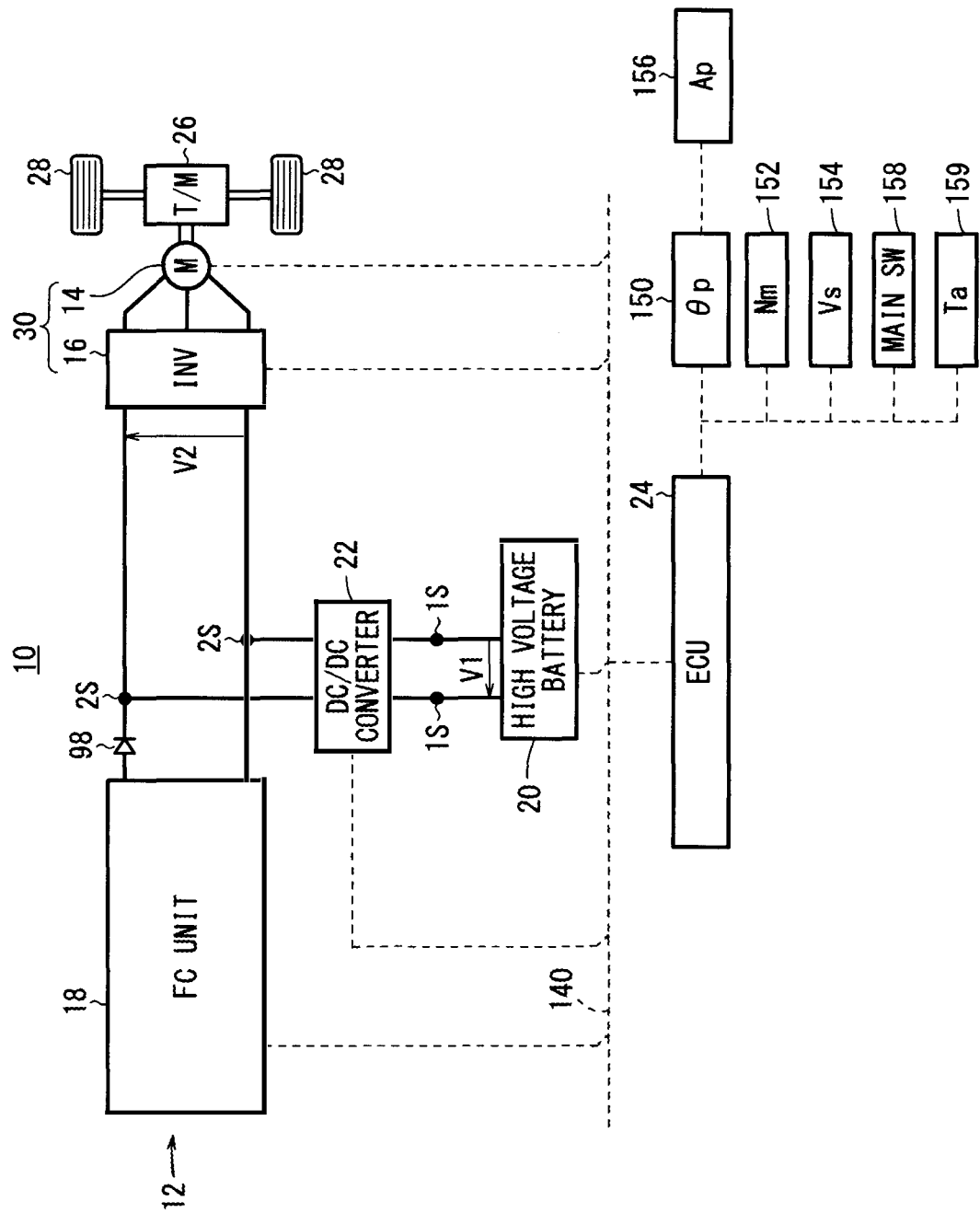
FIG. 1 is a diagram schematically showing an overall structure of a fuel cell vehicle equipped with a fuel cell system according to an embodiment of the present invention.
Figure 2:
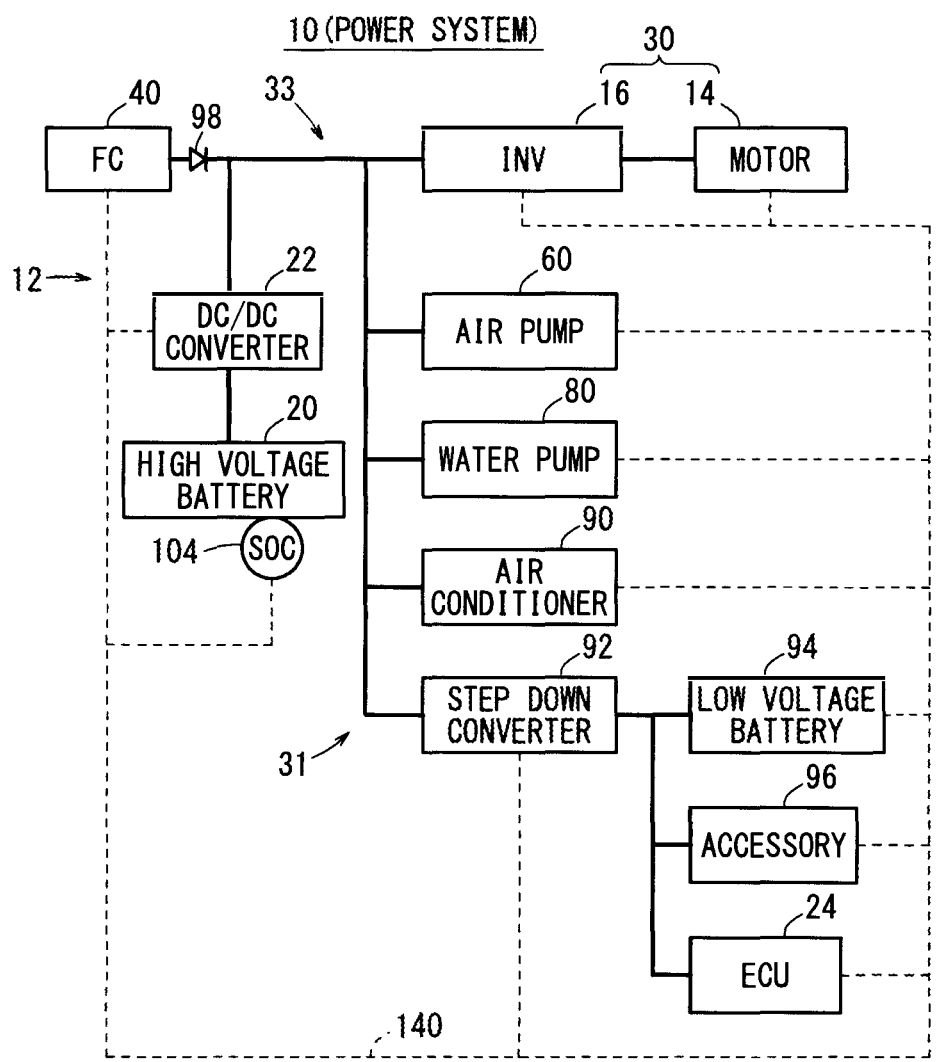
FIG. 2 is a block diagram showing a power system of the fuel cell vehicle.

FIG. 1 is a diagram schematically showing the overall structure of a fuel cell vehicle 10 (hereinafter referred to as the "FC vehicle 10") equipped with a fuel cell system 12 (hereinafter referred to as the "FC system 12") according to an embodiment of the present invention. FIG. 2 is a block diagram showing a power system of the FC vehicle 10. As shown in FIGS. 1 and 2, the FC vehicle 10 includes a traction motor 14 (drive motor) and an inverter (bidirectional DC-AC converter) 16 in addition to the FC system 12.

The FC system 12 includes a fuel cell unit 18 (hereinafter referred to as the "FC unit 18"), a high voltage battery (hereinafter referred to as the "battery 20") (energy storage device), a DC/DC converter (voltage regulator) 22, and an electronic control unit 24 (hereinafter referred to as the "ECU 24").

The motor 14 generates a driving force based on the electric power supplied from the FC unit 18 and the battery 20, and rotates wheels 28 using the driving force through a transmission 26. Further, the motor 14 outputs electric power generated by regeneration (regenerative electric power Preg) [W] to the battery 20 or the like (see FIG. 2).

The inverter 16 (also referred to as PDU (power drive unit)) has three phase full bridge structure, and carries out DC/AC conversion to convert direct current into alternating current in three phases. The inverter 16 supplies the alternating current to the motor 14, and supplies the direct current after AC/DC conversion as a result of regeneration of the motor 14 to the battery 20 or the like through a DC/DC converter 22.

It should be noted that the motor 14 and the inverter 16 are collectively referred to as a load 30 (also referred to as a main load 30 in a case where it is necessary to distinguish between the load 30 and loads of auxiliary devices (auxiliary device loads) 31 to be described later). The main load 30 and the auxiliary device loads 31 will be collectively referred to as a load 33 (also referred to as a total load 33).

Figure 3:
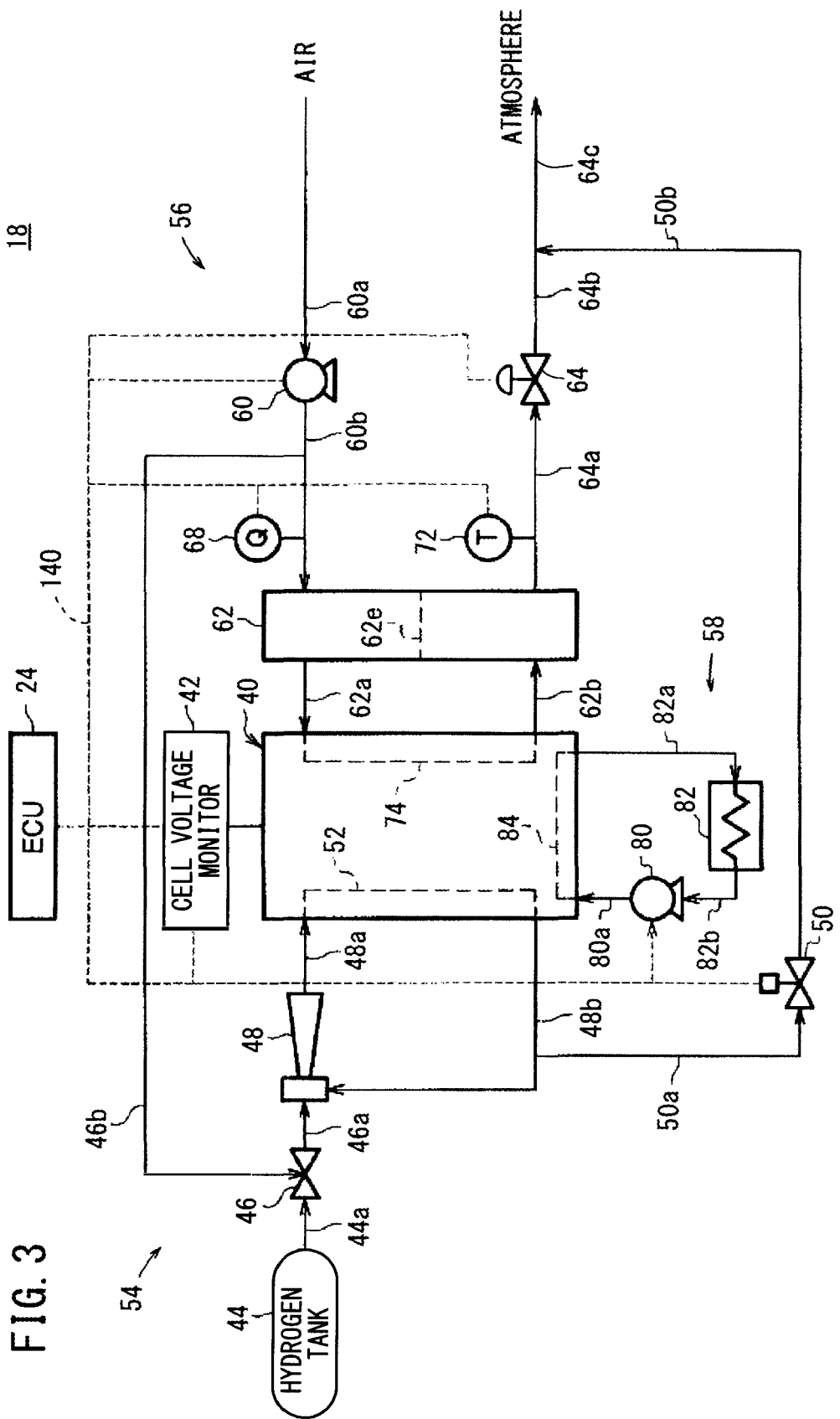
FIG. 3 is a diagram schematically showing a structure of a fuel cell unit according to the embodiment.

FIG. 3 is a diagram schematically showing a structure of the FC unit 18. The FC unit 18 includes a fuel cell stack 40 (hereinafter referred to as the "FC stack 40" or the "FC 40"), an anode system 54 for supplying hydrogen (fuel gas) to, and discharging the hydrogen (fuel gas) from anodes of the FC stack 40, a cathode system 56 for supplying the air (oxygen-containing gas) to, and discharging the air (oxygen-containing gas) from cathodes of the FC stack 40, a cooling system 58 for circulating coolant water (coolant) to cool the FC stack 40, and a cell voltage monitor 42.

For example, the FC stack 40 is formed by stacking fuel cells (hereinafter referred to as the "FC cells") each including an anode, a cathode, and a solid polymer electrolyte membrane interposed between the anode and the cathode.

The anode system 54 includes a hydrogen tank 44 (gas supply unit), a regulator 46, an ejector 48, and a purge valve 50. The hydrogen tank 44 contains hydrogen as the fuel gas. The hydrogen tank 44 is connected to the inlet of an anode channel 52 of FC 40 through a pipe 44a, a regulator 46, a pipe 46a, an ejector 48, and a pipe 48a. Thus, the hydrogen in the hydrogen tank 44 can be supplied to the anode channel 52 through the pipe 44a or the like. A shut-off valve (not shown) is provided in the pipe 44a. At the time of power generation of the FC stack 40, the shut-off valve is opened by the ECU 24.

The regulator 46 regulates the pressure of the supplied hydrogen to a predetermined value, and discharges the hydrogen. That is, the regulator 46 regulates the pressure on the downstream side (pressure of the hydrogen on the anode side) in response to the pressure (pilot pressure) of the air on the cathode side supplied through a pipe 46b. Therefore, the pressure of the hydrogen on the anode side is linked to the pressure of the air on the cathode side. As described later, by changing the rotation number or the like of an air pump 60 so as to change the oxygen concentration, the pressure of the hydrogen on the anode side changes as well.

The ejector 48 generates a negative pressure by ejecting hydrogen from the hydrogen tank 44 through a nozzle. By this negative pressure, the anode off gas can be sucked from a pipe 48b.

The outlet of the anode channel 52 is connected to a suction port of the ejector 48 through the pipe 48b. The anode off gas discharged from the anode channel 52 flows through the pipe 48b and again into the ejector 48 to allow circulation of the anode off gas (hydrogen).

The anode off gas contains hydrogen that has not been consumed in the electrode reaction at the anodes, and water vapor. Further, a gas-liquid separator (not shown) is provided at the pipe 48b for separating/recovering water components (condensed water (liquid) and water vapor (gas)) in the anode off gas.

Part of the pipe 48b is connected to a dilution device (not shown) provided in a pipe 64c, through a pipe 50a, a purge valve 50, and a pipe 50b. When it is determined that power generation of the FC stack 40 is not performed stably, the purge valve 50 is opened for a predetermined period in accordance with an instruction from the ECU 24. In the dilution device, the hydrogen in the anode off gas from the purge valve 50 is diluted by the cathode off gas and discharged to atmosphere.

The cathode system 56 includes the air pump 60 (gas supply unit), a humidifier 62, and a back pressure valve 64.

The air pump 60 compresses the external air (air), and supplies the compressed air to the cathode. A suction port of the air pump 60 is connected to the outside (outside of the vehicle, outside air of the vehicle) through a pipe 60a, and an ejection port of the air pump 60 is connected to the inlet of a cathode channel 74 through a pipe 60b, the humidifier 62, and a pipe 62a. When the air pump 60 is operated in accordance with an instruction from the ECU 24, the air pump 60 sucks the air outside the vehicle through the pipe 60a, compresses the sucked air, and supplies the compressed air to the cathode channel 74 of FC 40 through the pipe 60b or the like under pressure.

The humidifier 62 has a plurality of hollow fiber membranes 62e having water permeability. The humidifier 62 humidifies the air flowing toward the cathode channel 74 through the hollow fiber membranes 62e by exchanging water components between the air flowing toward the cathode channel 74 and the highly humidified cathode off gas discharged from the cathode channel 74.

A pipe 62b, the humidifier 62, a pipe 64a, the back pressure valve 64, the pipe 64b, and the pipe 64c are provided at the outlet of the cathode channel 74. The cathode off gas (oxygen-containing off gas) discharged from the cathode channel 74 is discharged from the pipe 64c to the outside of the vehicle (to atmosphere) through the pipe 62b or the like.

For example, the back pressure valve 64 is a butterfly valve, and the opening degree of the back pressure valve 64 is controlled by the ECU 24 to regulate the pressure of the air in the cathode channel 74. More specifically, if the opening degree of the back pressure valve 64 becomes small, the pressure of the air in the cathode channel 74 is increased, and oxygen concentration per volume flow rate (volume concentration) becomes high. Conversely, if the opening degree of the back pressure valve 64 becomes large, the pressure of the air in the cathode channel 74 is decreased, and oxygen concentration per volume flow rate (volume concentration) becomes low.

A temperature sensor 72 is attached to the pipe 64a. The temperature sensor 72 detects the temperature of the cathode off gas, and outputs the detected temperature to the ECU 24.

The cooling system 58 includes a water pump 80 and a radiator (heat radiator) 82. The water pump 80 circulates the coolant water (coolant), and an ejection port of the water pump 80 is connected to a suction port of the water pump 80 through a pipe 80a, a coolant channel 84 of the FC stack 40, a pipe 82a, the radiator 82, and a pipe 82b in the order listed. When the water pump 80 is operated in accordance with an instruction from the ECU 24, the coolant water is circulated between the coolant channel 84 and the radiator 82 to cool the FC stack 40.

The cell voltage monitor 42 is a measurement instrument for detecting the cell voltage Vcell of each of unit cells of the FC stack 40. The cell voltage monitor 42 includes a monitor body, and a wire harness connecting the monitor body with each of the unit cells. The monitor body scans all of the unit cells at predetermined intervals to detect the cell voltage Vcell of each cell, and calculates the average cell voltage and the lowest cell voltage. Then, the monitor body outputs the average cell voltage and the lowest cell voltage to the ECU 24.

As shown in FIG. 2, electric power from the FC stack 40 (hereinafter referred to as the "FC electric power Pfc") is supplied to the inverter 16 and the motor 14 (during power running), and to the high voltage battery 20 through the DC/DC converter 22 (during charging). Further, the FC electric power Pfc is supplied to the air pump 60, the water pump 80, the air conditioner 90, a downverter 92 (step down converter), a low voltage battery 94, an accessory 96, and the ECU 24. A backflow prevention diode 98 is disposed between the FC stack 40 and the inverter 16 and the DC/DC converter 22. Further, the power generation voltage of the FC 40 (hereinafter referred to as the "FC voltage Vfc") is detected by a voltage sensor 100 (FIG. 4), and the power generation current of the FC 40 (hereinafter referred to as the FC current Ifc") is detected by a current sensor 102. The FC voltage Vfc and the FC current Ifc are outputted to the ECU 24.

The battery 20 is an energy storage device (energy storage) containing a plurality of battery cells. For example, a lithium-ion secondary battery, a nickel hydrogen secondary battery, or a capacitor can be used as the battery 20. In the embodiment, the lithium-ion secondary battery is used. The output voltage [V] of the battery 20 (hereinafter referred to as the "battery voltage Vbat or primary voltage V1") is detected by a voltage sensor 120, and the output current [A] of the battery 20 (hereinafter referred to as the "battery current Ibat or primary current I1") is detected by a current sensor 124. The battery voltage Vbat and the battery current Ibat are outputted to the ECU 24. The remaining battery level (state of charge) (hereinafter referred to as the "SOC") [%] of the battery 20 is detected by a SOC sensor 104 (FIG. 2), and outputted to the ECU 24.

Under the control of the ECU 24, the DC/DC converter 22 controls targets to which the FC electric power Pfc [W] from the FC unit 18, the electric power [W] supplied from the battery 20 (hereinafter referred to as the "battery electric power Pbat"), and the regenerative electric power from the motor 14 are supplied.

Figure 4:
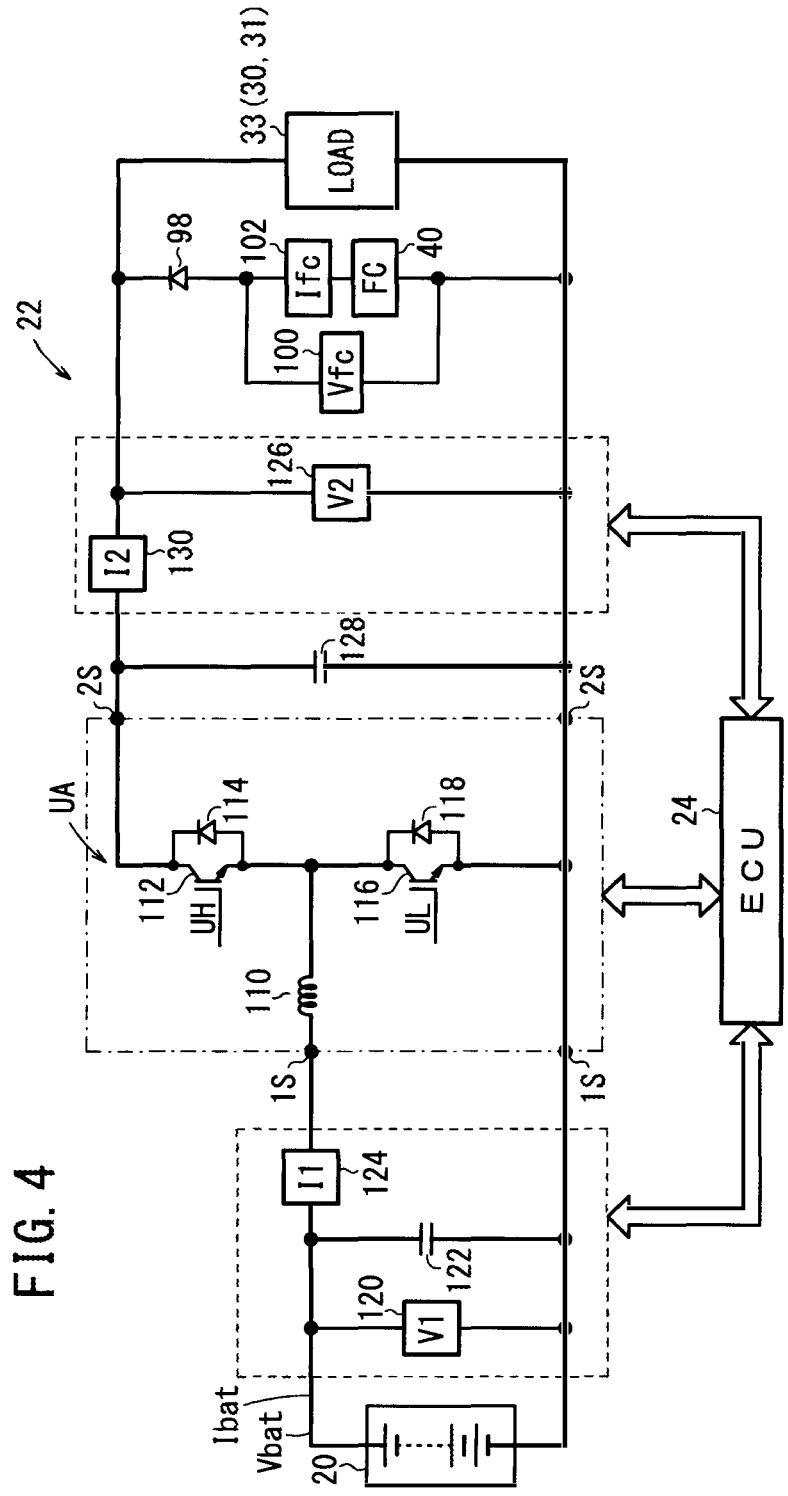
FIG. 4 is a circuit diagram showing details of a DC/DC converter according to the embodiment.

FIG. 4 shows an example of the DC/DC converter 22 in the present embodiment. As shown in FIG. 4, one side of the DC/DC converter 22 is connected to the primary side 1S where the battery 20 is provided, and the other side of the DC/DC converter 22 is connected to the secondary side 2S, which is connection points between the load 33 and the FC stack 40.

The DC/DC converter 22 is basically a chopper type step up/down voltage converter for increasing the voltage on the primary side 1S (primary voltage V1=Vbat) [V] to the voltage on the secondary side 2S (secondary voltage V2) [V] (V1≤V2), and decreasing the secondary voltage V2 to the primary voltage V1 (V1=Vbat).

As shown in FIG. 4, the DC/DC converter 22 includes a phase arm UA interposed between the primary side 1S and the secondary side 2S, and a reactor 110.

The phase arm UA includes an upper arm element (an upper arm switching element 112 and a diode 114) as a high-side arm and a lower arm element (a lower arm switching element 116 and a diode 118) as a low-side arm. For example, MOSFET, IGBT, or the like is adopted in each of the upper arm switching element 112 and the lower arm switching element 116.

The reactor 110 is interposed between the middle point (common connection point) of the phase arm UA and the positive electrode of the battery 20. The reactor 110 is operated to release and accumulate energy during voltage conversion between the primary voltage V1 and the secondary voltage V2 by the DC/DC converter 22.

The upper arm switching element 112 is turned on when high level of a gate drive signal (drive voltage) UH is outputted from the ECU 24, and the lower arm switching element 116 is turned on when high level of a gate drive signal (drive voltage) UL is outputted from the ECU 24.

The ECU 24 detects primary voltage V1 [V] by a voltage sensor 120 provided in parallel with a smoothing capacitor 122 on the primary side 1S, and detects electrical current on the primary side 1S (primary current I1) [A] by a current sensor 124. Further, the ECU 24 detects secondary voltage V2 [V] by a voltage sensor 126 provided in parallel with the smoothing capacitor 128 on the secondary side 2S, and detects electrical current on the secondary side 2S (secondary current I2) [A] by a current sensor 130.

At the time of stepping up the voltage of the DC/DC converter 22, at the first timing, the gate drive signal UL is switched to high level, and the gate drive signal UH is switched to low level. Electricity from the battery 20 is stored in the reactor 110 (through a current path extending from the positive side of the battery 20 through the reactor 110 and the lower arm switching element 116 to the negative side of the battery 20). At the second timing, the gate drive signal UL is switched to low level, and the gate drive signal UH is switched to low level. Electricity stored in the reactor 110 is supplied to the secondary side 2S through the diode 114 (through a current path extending from the positive side of the battery 20 through the reactor 110, the diode 114, the positive side of the secondary side 2S, the load 33 or the like, and the negative side of the secondary side 2S to the negative side of the battery 20). Thereafter, the first timing and the second timing are repeated during the period in which the voltage is stepped up.

At the time of stepping down the voltage of the DC/DC converter 22, at the first timing, the gate drive signal UH is switched to high level, and the gate drive signal UL is switched to low level. Electricity from the secondary side 2S (FC stack 40 or the load 33 during electric power regeneration by the motor 14) is stored in the reactor 110, and with the electricity, the battery 20 is charged. At the second timing, the gate drive signal UH is switched to low level, and the gate drive signal UL is switched to low level. Electricity stored in the reactor 110 is supplied to the battery 20 through the diode 118, and with the electricity, the battery 20 is charged. As can be seen from FIG. 2, the regenerative electric power from the motor 14 can be supplied to loads 31 of auxiliary devices such as the air pump 60. Thereafter, the first timing and the second timing are repeated during the period in which the voltage is stepped down.

As described above, the DC/DC converter 22 is operated as a chopper type converter. Further, the DC/DC converter 22 can be operated as a direct connection type converter. In the case where the DC/DC converter 22 is operated as the direct connection type converter, when the gate drive signal UH is switched to high level at the duty of 100 [%], and the gate drive signal UL is switched to low level at the duty of 0 [%], thereby discharging electric power from the battery 20, electrical current is supplied from the primary side 1S to the secondary side 2S through the diode 114 (e.g., electric power is supplied from the battery 20 to the load 33). At the time of charging the battery 20 with electric power, the electric power is supplied from the secondary side 2S to the battery 20 through the upper arm switching element 112 (e.g., regenerative electric power is supplied from the motor 14 to the battery 20).

The ECU 24 controls the motor 14, the inverter 16, the FC unit 18, the auxiliary device loads 31, the battery 20, the DC/DC converter 22, etc. through a communication line 140 (see e.g., FIG. 1). For implementing the control, programs stored in a memory (ROM) are executed, and detection values obtained by various sensors such as the cell voltage monitor 42, the flow rate sensors 68, the temperature sensor 72, the voltage sensors 100, 120, 126, the current sensors 102, 124, 130, and the SOC sensor 104 are used.

In addition to the above sensors, the various sensors herein include an opening degree sensor 150, a motor rotation number sensor 152, a vehicle velocity sensor 154, and an outside temperature sensor 159 (FIG. 1). The opening degree sensor 150 detects the opening degree (accelerator opening degree) $\theta p$ [degrees] of an accelerator pedal 156, which is an accelerator pedal angle, and the rotation number sensor 152 detects the rotation number Nm [rpm] of the motor 14. The vehicle velocity sensor 154 detects the vehicle velocity Vs [km/h] of the FC vehicle 10. The outside temperature sensor 159 detects an outside temperature Ta [° C.]. Further, a main switch 158 (hereinafter referred to as the "main SW 158") is connected to the ECU 24. The main SW 158 switches between supply and non-supply of the electric power from the FC unit 18 and the battery 20 to the motor 14. This main SW 158 can be operated by a user and corresponds to the ignition switch of an engine vehicle.

The control means including ECU 24 includes a microcomputer. Further, as necessary, the control means including the ECU 24 has a timer and input/output (I/O) interfaces such as an A/D converter and a D/A converter. The ECU 24 may comprise only a single ECU. Alternatively, the control means including the ECU 24 may comprise a plurality of ECUs for each of the motor 14, the FC unit 18, the battery 20, and the DC/DC converter 22.

After the load required by the FC system 12, i.e., required by the FC vehicle 10 as a whole is determined based on the state of the FC stack 40, the state of the battery 20, and the state of the motor 14, and also based on inputs (load requests) from various switches and various sensors, the ECU 24 determines allocation (shares) of loads through adjustment, and more specifically determines a good balance among a load which should be assigned to the FC stack 40, a load which should be assigned to the battery 20, and a load which should be assigned to the regenerative power supply (motor 14), and sends instructions to the motor 14, the inverter 16, the FC unit 18, the battery 20, and the DC/DC converter 22.

[Explanation of Basic Control Operation]

Next, operation of basic control in the ECU 24 will be described. On the premise of the basic control, first through third embodiments will be described later.

Figure 5:
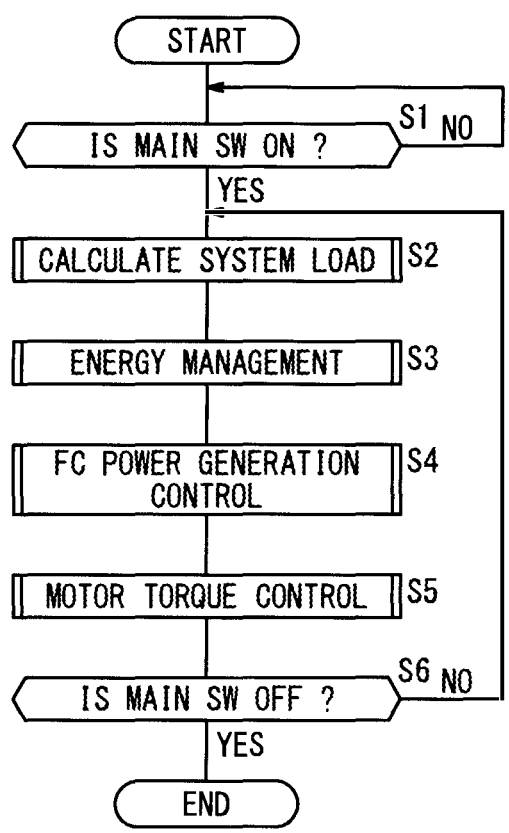
FIG. 5 is a flow chart showing basic control (main routine) in an electronic control unit (ECU)

FIG. 5 is a flow chart showing basic control (main routine) in the ECU 24. In step S1, the ECU 24 determines whether or not the main SW 158 is in an ON state. If the main SW 158 is not in the ON state (S1: NO), step S1 is repeated. If the main SW 158 is in the ON state (S1: YES), the control proceeds to step S2. In step S2, the ECU 24 calculates the load (system load Psys or system requirement load Psys) [W] required by the FC system 12.

In step S3, the ECU 24 performs energy management of the FC system 12 based on the calculated system load Psys. The energy management herein is intended to suppress degradation of the FC stack 40, and improve the efficiency in the output (system efficiency) of the entire FC system 12.

In step S4, based on the results of energy management operation, the ECU 24 implements control for peripheral devices of the FC stack 40, i.e., the air pump 60, the back pressure valve 64, and the water pump 80 (FC power generation control). In step S5, the ECU 24 implements torque control of the motor 14.

In step S6, the ECU 24 determines whether or not the main SW 158 is in an OFF state. If the main SW 158 is not in the OFF state (S6: NO), the control returns to step S2. If the main SW 158 is in the OFF state (S6: YES), the current process is finished.

Figure 6:
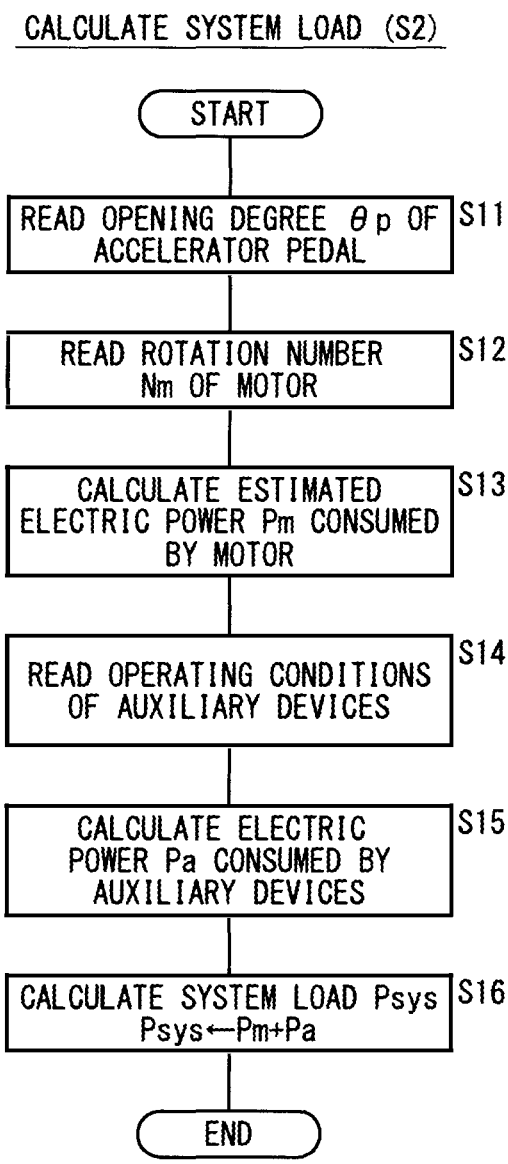
FIG. 6 is a flow chart of calculating a system load.

FIG. 6 is a flow chart for calculating the system load Psys in step S2. In step S11, the ECU 24 reads the opening degree $\theta p$ of the accelerator pedal 156 from the opening degree sensor 150. In step S12, the ECU 24 reads the rotation number Nm [rpm] of the motor 14 from the rotation number sensor 152.

Figure 7:
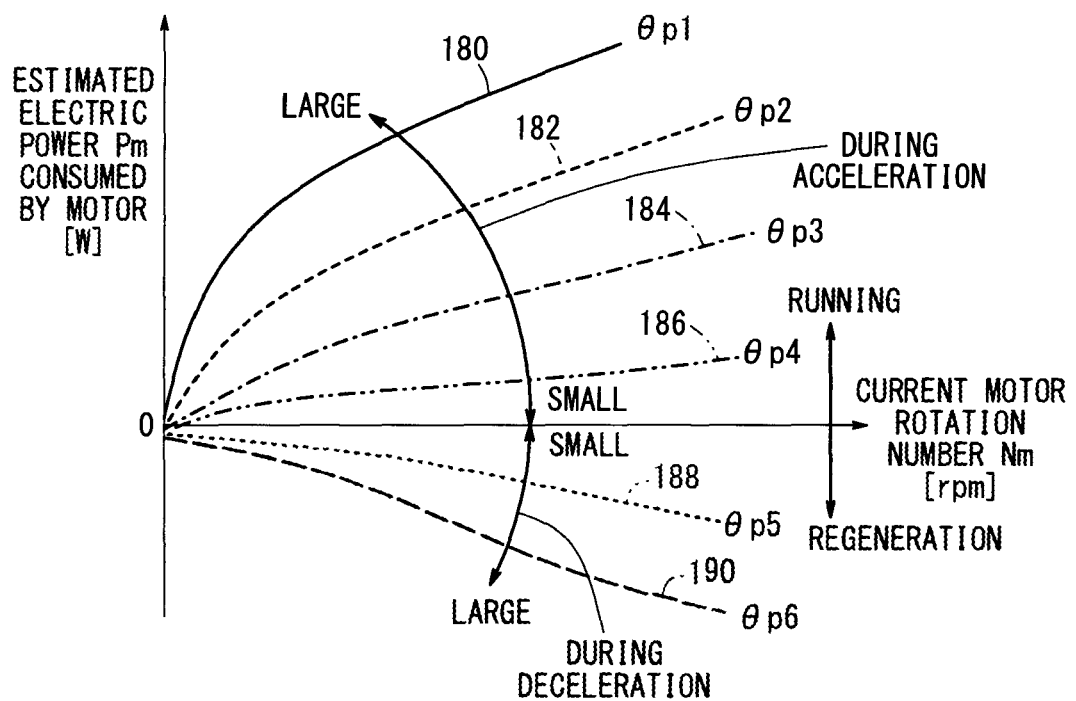
FIG. 7 is a graph showing the relationship between the current rotation number of a motor and the estimated electric power consumed by the motor.

In step S13, the ECU 24 calculates the estimated electric power Pm [W] consumed by the motor 14 based on the opening degree $\theta p$ and the rotation number Nm. Specifically, in a map (characteristics) as shown in FIG. 7, the relationship between the rotation number Nm [rpm] of the motor 14 and the estimated electric power Pm [W] consumed by the motor 14 is stored for each opening degree $\theta p$. For example, in the case where the opening degree $\theta p$ is $\theta p1$, a characteristic 180 is used. Likewise, in the cases where the opening degrees $\theta p$ are $\theta p2$, $\theta p3$, $\theta p4$, $\theta p5$, and $\theta p6$, characteristics 182, 184, 186, 188, and 190 are used, respectively. After the characteristic indicating the relationship between the rotation number Nm and the estimated consumed electric power Pm is determined based on the opening degree $\theta p$, the estimated consumed electric power Pm in correspondence with the rotation number Nm is determined based on the determined characteristic. During acceleration in the power running mode, the estimated consumed electric power Pm has a positive value. During deceleration in the regenerating mode, the estimated consumed electric power Pm has a negative value. That is, in this mode, the estimated consumed electric power Pm indicates estimated regenerative electric power.

In step S14, the ECU 24 reads data of the current operating conditions from the load 31 of auxiliary devices. For example, as shown in FIG. 2, the auxiliary devices herein include high voltage auxiliary devices, such as the air pump 60, the water pump 80, and the air conditioner 90, and low voltage auxiliary devices, such as the low voltage battery 94, the accessory 96, and the ECU 24. For example, as for the operating condition of the air pump 60, the rotation number Nap [rpm] of the air pump 60 is read. As for the operating condition of the water pump 80, the rotation number Nwp [rpm] of the water pump 80 is read. As for the operating condition of the air conditioner 90, output settings of the air conditioner 90 are read.

In step S15, the ECU 24 calculates the electric power Pa [W] consumed by the auxiliary devices depending on the present operating conditions of the auxiliary devices.

In step S16, the ECU 24 calculates the sum of the estimated electric power Pm consumed by the motor 14 and electric power Pa consumed by the auxiliary devices (provisional system load Pm+Pa) to determine the estimated electric power consumption in the entire FC vehicle 10. That is, the ECU 24 calculates the system load Psys (Psys=Pm+Pa, also denoted as Psys←Pm+Pa).

As described above, the energy management according to the present embodiment is aimed to suppress degradation of the FC stack 40, and improve the efficiency in the output of the entire FC system 12.

Figure 8:
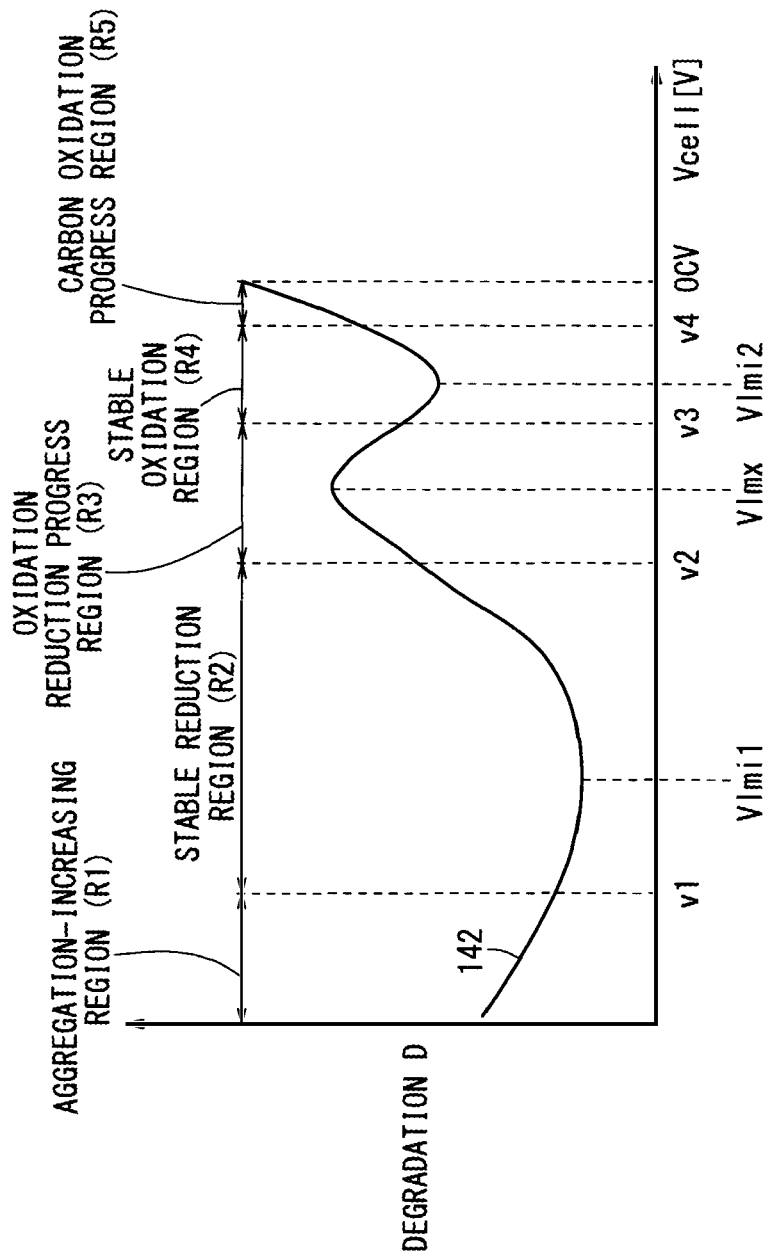
FIG. 8 is a graph showing an example of the relationship between the voltage of a fuel cell of a fuel cell stack and degradation of the fuel cell.

FIG. 8 shows an example of the relationship between the voltage of the FC cell of the FC stack 40 (cell voltage Vcell) [V] and the degradation D of the cell. That is, a curve (characteristic) 142 in FIG. 8 shows the relationship between the cell voltage Vcell and the degradation D.

In FIG. 8, in a region below the voltage v1 (e.g., 0.5V), reduction reaction of platinum (oxidized platinum) in the FC cell proceeds severely, and aggregation of platinum occurs excessively (hereinafter referred to as the "platinum aggregation-increasing region R1" or the "aggregation-increasing region R1"). In a region from the voltage v1 to the voltage v2 (e.g., 0.8 V), reduction reaction proceeds stably (hereinafter referred to as the "stable platinum reduction region R2", the "stable reduction region R2", or the "region R2 of a voltage range where catalyst reduction proceeds stably").

In a region from the voltage v2 to the voltage v3 (e.g. 0.9 V), oxidation-reduction reaction of platinum proceeds (hereinafter referred to as the "platinum oxidation reduction progress region R3" or the "oxidation reduction progress region R3"). In a region from the voltage v3 to the voltage v4 (e.g., 0.95V), oxidation reaction of platinum proceeds stably (hereinafter referred to as the stable platinum oxidation region R4" or the "stable oxidation region R4", or the "region R2 of a voltage range where catalyst oxidation proceeds stably"). In a region from the voltage v4 to OCV (open circuit voltage), oxidation of carbon in the FC cell proceeds (hereinafter referred to as the "carbon oxidation progress region R5").

As described above, in FIG. 8, if the cell voltage Vcell is in the stable platinum reduction region R2 or the stable platinum oxidation region R4, degradation of the FC cell occurs to a smaller extent. In contrast, if the cell voltage Vcell is in the platinum aggregation increasing region R1, the platinum oxidation reduction progress region R3, or the carbon oxidation progress region R5, degradation of the FC cell occurs to a greater extent.

In FIG. 8, on the face of it, a curve (characteristic) 142 is uniquely determined. However, in practice, the curve (characteristic) 142 varies depending on variation of the cell voltage Vcell (varying speed Acell) [V/sec] per unit time.

Figure 9:
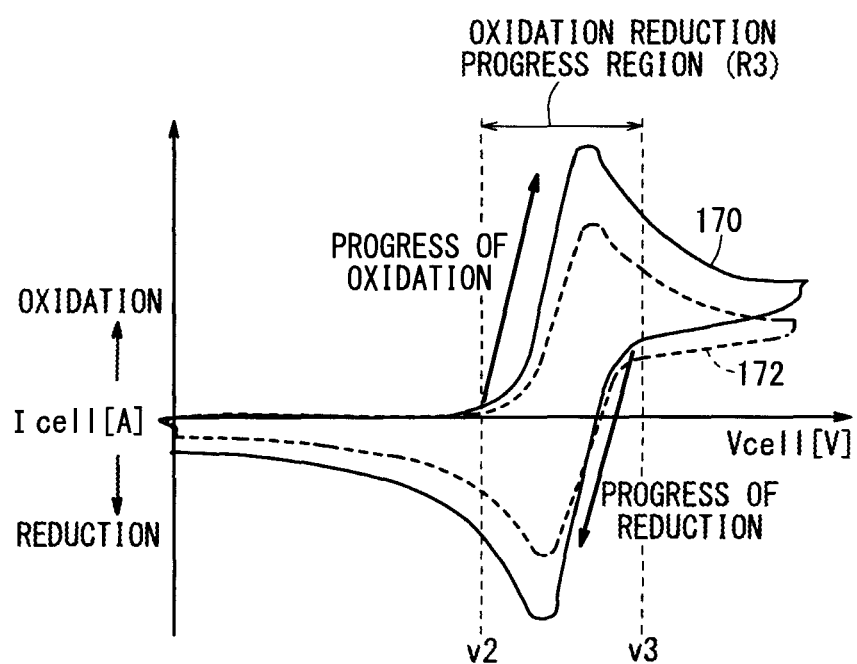
FIG. 9 is a cyclic voltammetry diagram showing an example of the progress of oxidation and the progress of reduction in the cases of different varying speeds in the voltage of the fuel cell.

FIG. 9 is a cyclic voltammetry diagram showing an example of the progress of oxidation and the progress of reduction in the cases of different varying speeds Acell. In FIG. 9, a solid curve 170 (characteristic) shows a case where the varying speed Acell is high, and a dotted curve 172 (characteristic) shows a case where the varying speed Acell is low. As can be seen from FIG. 9, since the degree of the progress in oxidation or reduction varies depending on the varying speed Acell, the voltages v1 to v4 (FIG. 8) cannot necessarily be determined uniquely. Further, the voltages v1 to v4 (FIG. 8) may change depending on the individual difference in the FC cell. Therefore, preferably, the voltages v1 to v4 (F*ig*. 8) should be set such that errors are reflected in the theoretical values, the simulation values, or the measured values.

Further, in the current-voltage (I-V) characteristic of the FC cell, as in the case of normal fuel cells, as the cell voltage Vcell decreases, the cell current Icell [A] is increased (see a I-V characteristic 162 indicated by "normal" in FIG. 10, and hereinafter referred to as "normal I-V characteristic"). Additionally, the power generation voltage (FC voltage Vfc) of the FC stack 40 is obtained by multiplying the cell voltage Vcell by the serial connection number Nfc in the FC stack 40. The serial connection number Nfc indicates the number of FC cells connected in series in the FC stack 40. The serial connection number Nfc is also simply referred to as the "cell number".

Figure 10:
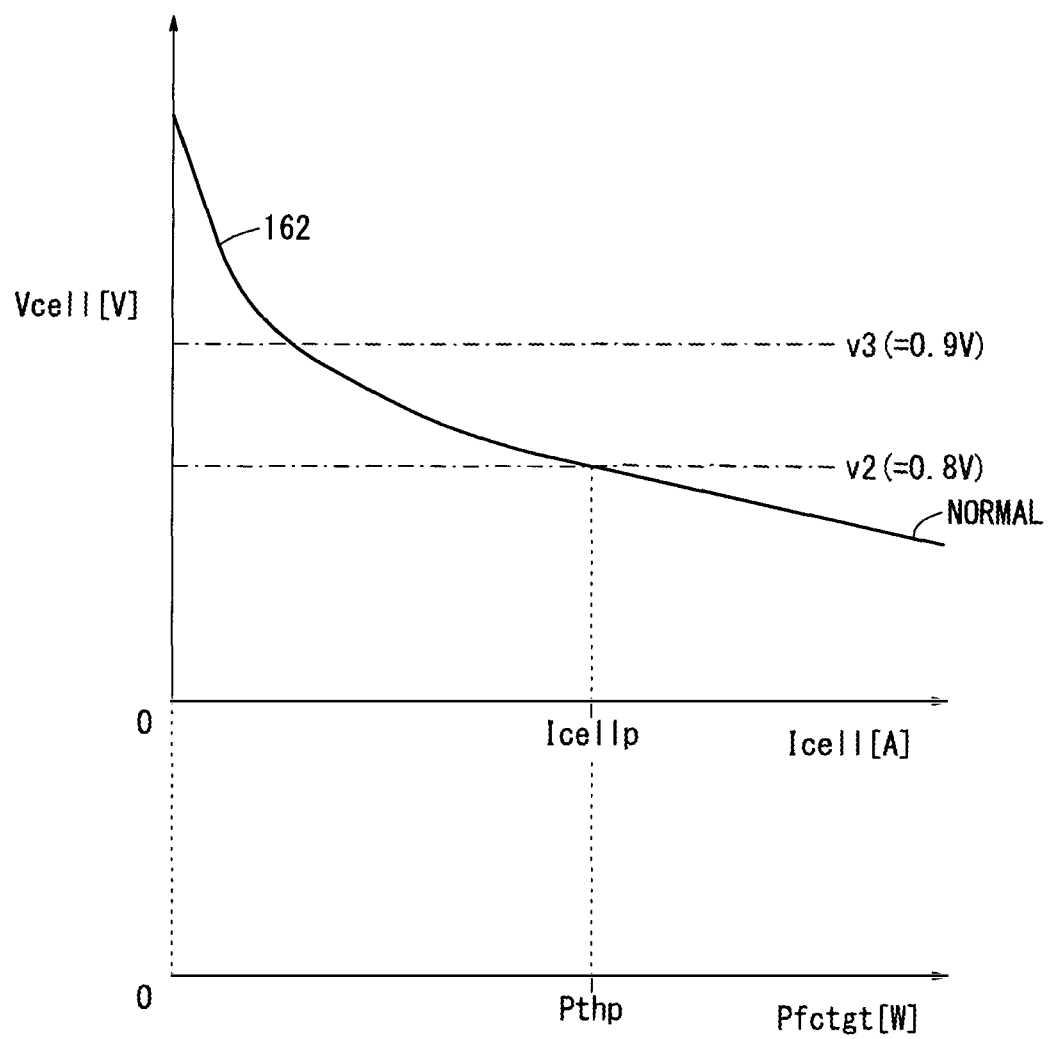
FIG. 10 is a graph showing a normal current-voltage characteristic of a fuel cell.

The normal I-V characteristic 162 in FIG. 10 is obtained when oxygen is in a rich state, i.e., the cathode stoichiometric ratio (which is nearly equal to oxygen concentration) is the normal stoichiometric ratio or more. Stated otherwise, when oxygen is in a rich state, the oxygen concentration is the normal oxygen concentration or more. The cathode stoichiometric ratio herein means (the flow rate of the air supplied to the cathode)/(the flow rate of the air consumed by power generation). In the present embodiment, the cathode stoichiometric ratio is also simply referred to as the stoichiometric ratio.

Figure 11:
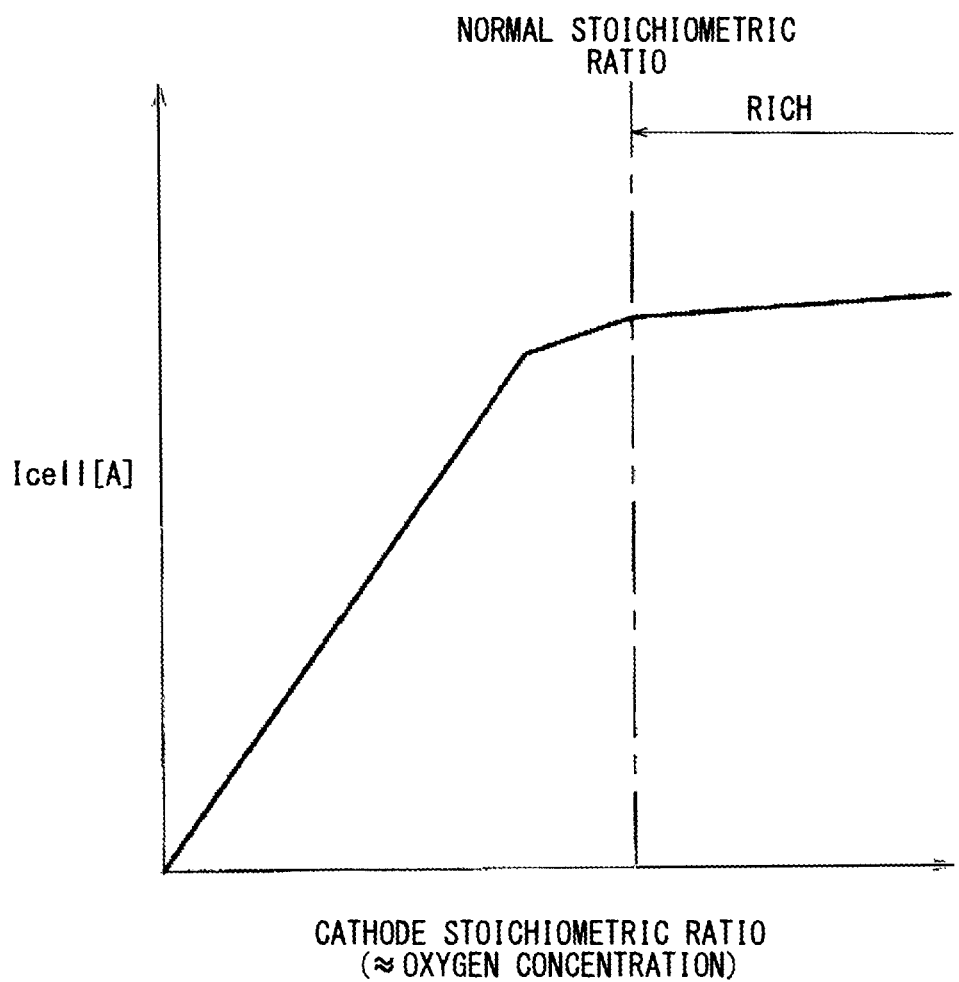
FIG. 11 is a graph showing the relationship between the cathode stoichiometric ratio and the cell current.

The expression "oxygen is in a rich state" means a state where, as shown in FIG. 11, even if the cathode stoichiometric ratio (which is nearly equal to oxygen concentration) is increased, the cell current Icell outputted from the unit cell is kept substantially at a constant level. In this state, oxygen is present in a region above the normal stoichiometric ratio, where oxygen is saturated.

The stoichiometric ratio of hydrogen should be understood in the same manner. That is, the anode stoichiometric ratio (which is nearly equal to hydrogen concentration) is represented by (the flow rate of the hydrogen supplied to the anode)/(the flow rate of the hydrogen consumed by power generation).

Figure 12:
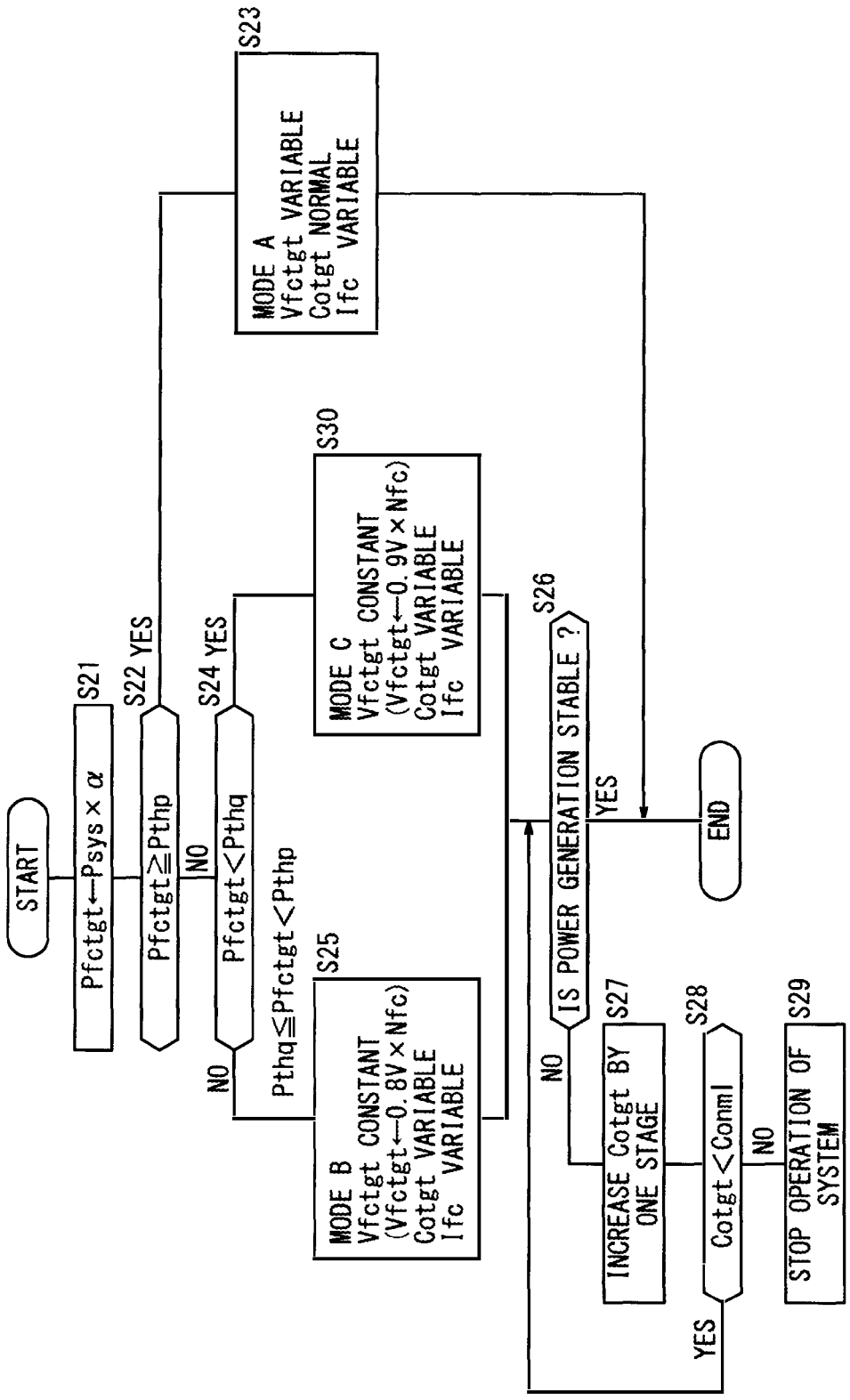
FIG. 12 is a flow chart illustrating a basic control mode according to power generation control of a fuel cell.

Next, in the FC power generation control in step S4, basic control (basic power generation control) will be described with reference to a flow chart in FIG. 12.

In step S21, the ECU 24 calculates the charging/discharging coefficient α, and multiplies the system load Psys calculated in step S16 by the calculated charging/discharging coefficient α to calculate target FC electric power (Pfctgt←Psys× α).

Figure 14:
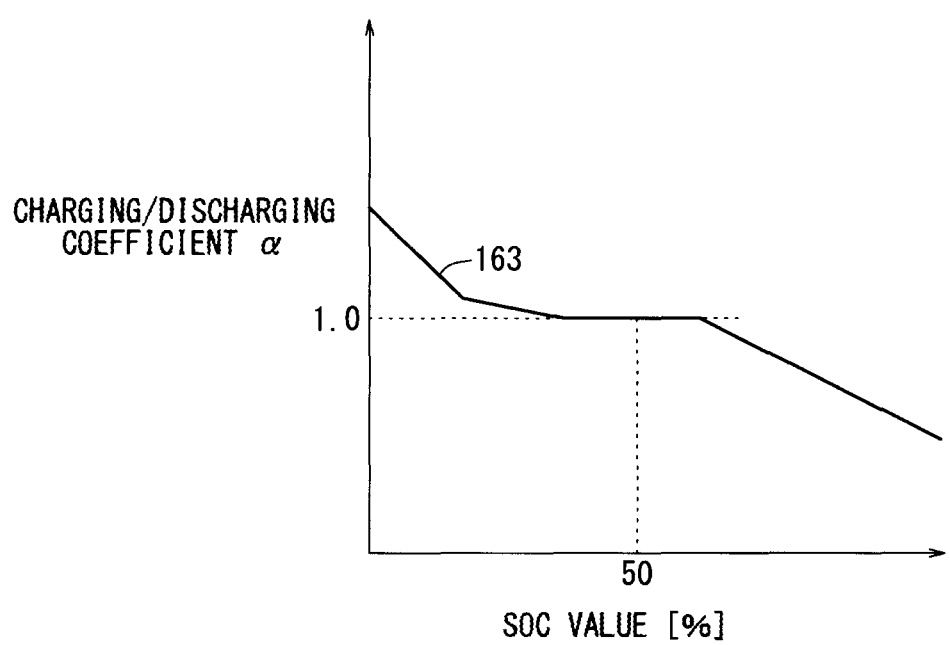
FIG. 14 is a graph showing the relationship between the SOC value of a battery and the charging/discharging coefficient.

The charging/discharging coefficient α herein is calculated based on the current SOC value inputted from the SOC sensor 104 and a characteristic (map) 163 in FIG. 14. For example, measured values, simulation values or the like may be used as the characteristic 163 in FIG. 14, and are stored in the ECU 24 in advance. In the embodiment, target SOC (target energy storage amount) of the battery 20 is 50 [%]. However, the present invention is not limited in this respect.

In the embodiment, as shown in FIG. 14, in a region where the SOC value is less than 50 [%] (when charging is required), the charging/discharging coefficient α is set to a value greater than "1". In this manner, power generation is performed excessively in the FC stack 40, and the excessive electric power is used for charging the battery 20. In a region where SOC value is greater than 50 [%] (when the battery 20 is in a sufficiently charged state), the charging/discharging coefficient α is set to a value less than "1". In this manner, shortage of electric power occurs in power generation of the FC stack 40, and electric power discharged from the battery 20 is utilized to compensate for the shortage of electric power.

For ease of understanding, in the following description, it is assumed that the charging/discharging coefficient α is 1 (Pfctgt=Psys).

In step S22, the ECU 24 determines whether or not the target power generation electric power Pfctgt calculated in step S21 is a threshold electric power Pthp or more (Psys Pthp).

The threshold electric power Pthp herein means a fixed value obtained by multiplying the "cell voltage which is considered to cause no degradation of catalyst (0.8 V, switching voltage, predetermined voltage)", "the number of unit cells of the FC stack 40 (cell number Nfc)", and the "current value Icellp in the case where the cell voltage is 0.8 V in the normal I-V characteristic 162 of the FC stack 40 (see FIG. 10)". This threshold electric power Pthp can be calculated by the following expression (1). In FIG. 10, it should be noted that the axis of the target electric power Pfctgt is not linear.

$$Pthp = 0.8 \, [V] \times Nfc \times Icellp \qquad (1)$$

In the case where the target power generation electric power Pfctgt is the threshold electric power Pthp or more (S22: YES), in step S23, voltage variable/current variable control (mode A control) is implemented to obtain the target FC electric power Pfctgt.

This mode A control is mainly used when the target FC electric power Pfctgt is relatively high. In the state where the target oxygen concentration Cotgt is kept in a normal state (including the oxygen rich state), the target FC voltage Vfctgt is regulated by the DC/DC converter 22 thereby to control the FC current Ifc.

Figure 13:
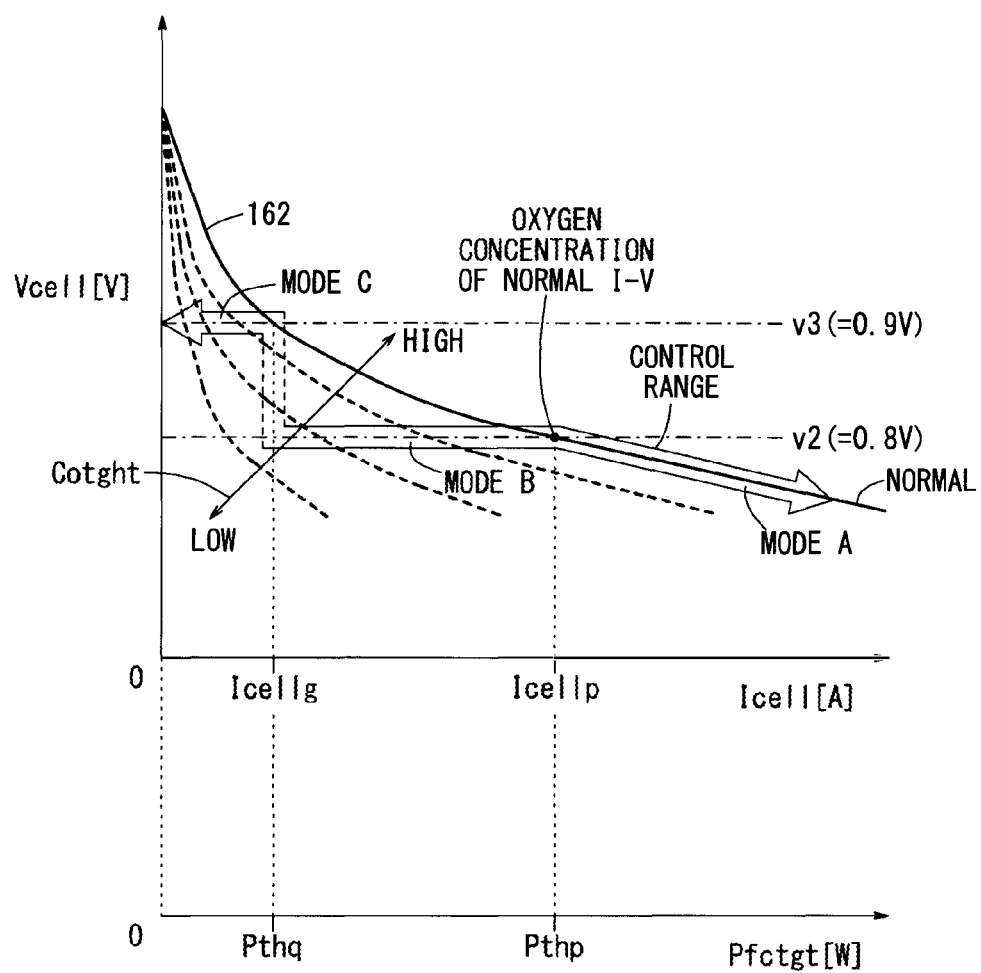
FIG. 13 is a graph showing a plurality of power supply modes (e.g., basic control mode) in the fuel cell.

That is, as shown in FIG. 13, in the mode A control implemented when the target FC electric power Pfctgt is the threshold electric power Pthp or more, the normal I-V characteristic 162 of the FC stack 40 (same as that shown in FIG. 10) is used. In the mode A control, the target FC current Ifctgt is calculated in correspondence with the target FC electric power Pfctgt. Further, the target FC voltage Vfctgt is calculated in correspondence with the target FC current Ifctgt. Then, the ECU 24 controls the DC/DC converter 22 such that the FC voltage Vfc is regulated to be the target FC voltage Vfctgt. That is, the FC voltage Vfc is controlled to control the FC current Ifc by increasing (stepping up) the primary voltage V1 by the DC/DC converter 22 such that the second voltage V2 is regulated to be the target FC voltage Vfctgt.

In the mode A control as described above, even if the target FC electric power Pfctgt is the threshold electric power Pthp or more, i.e., the system load Psys is high, the secondary voltage V2 (FC voltage Vfc) is changed by the DC/DC converter 22 according to the normal I-V characteristic 162 in correspondence with the target FC electric power Pfctgt, whereby basically the system load Psys can be covered by the FC electric power Pfc.

In the determination in step S22, if the target FC electric power Pfctgt is less than the threshold electric power Pthp (step S22: NO), then in step S24, it is determined whether or not the target FC electric power Pfctgt calculated in step S21 is less than the threshold electric power Pthq (Pfctgt<Pthq). For example, the threshold electric power Pthq corresponding to the cell voltage of 0.9[V] (Vcell=0.9[V]) is determined. Therefore, the threshold electric power Pthq is smaller than the threshold electric power Pthp (Pthq<Pthp, see FIG. 13).

In the case where the determination in step S24 is negative, i.e., in the case where the target FC electric power Pfctgt is less than the threshold electric power Pthp, and equal to or more than the threshold electric power Pthq (step S24: NO, Pthq≤Pfctgt<Pthp), in step S25, voltage fixed/current variable control (mode B control) is implemented.

The mode B control is mainly used when the system load Psys is relatively medium. In the state where the target cell voltage $Vcell_{tgt}$(=target FC voltage Vfctgt/cell number Nfc) is fixed to the reference voltage (in the present embodiment, voltage v2 (=0.8 V)) which is set to be equal to or less than the voltage below the oxidation reduction progress region R3, the target oxygen concentration is variable, and thus, the FC current Ifc is variable.

That is, as shown in FIG. 13, in the mode B control, in the range between the threshold electric power Pthq and the threshold electric power Pthp, the cell voltage Vcell is kept at a constant level (Vcell=v2). In this state, the target oxygen concentration Cotgt is decreased thereby to decrease the oxygen concentration Co.

As shown in FIG. 11, as the cathode stoichiometric ratio (which is nearly equal to the oxygen concentration Co) decreases, the cell current Icell (FC current Ifc) is accordingly decreased. Therefore, in the state where the cell voltage Vcell is kept at a constant level (Vcell=v2=0.8 V), by increasing or decreasing the target oxygen concentration Cotgt, it becomes possible to control the cell current Icell (FC current Ifc) and the FC electric power Pfc. The shortage of the FC electric power Pfc is assisted by the battery 20.

Figure 15:
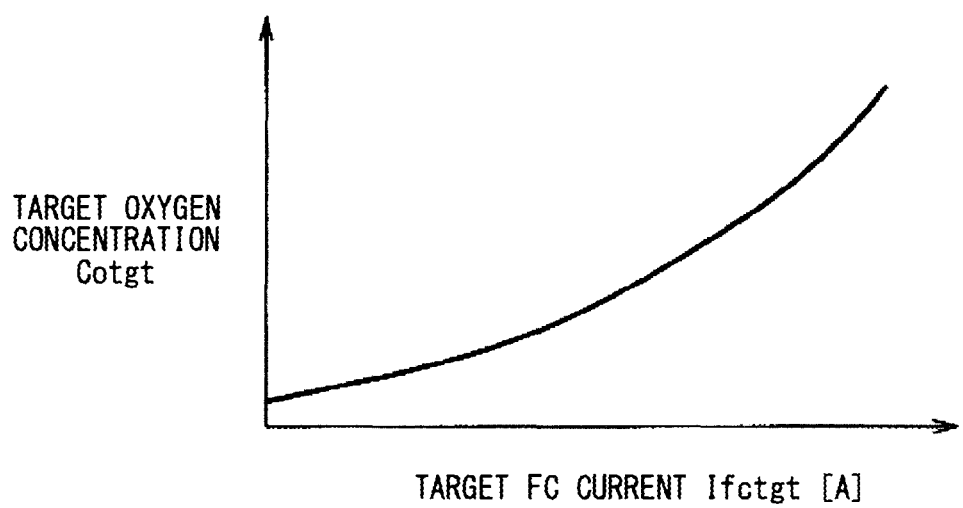
FIG. 15 is a graph showing the relationship between the target FC current and the target oxygen concentration.

In this case, the ECU 24 regulates the step up voltage ratio of the DC/DC converter 22 thereby to fix the target FC voltage Vfctgt at the reference voltage (in the present embodiment, the voltage v2 (=0.8V)) which is set to be equal to or less than the voltage below the oxidation reduction progress region R3, and calculates the target FC current Ifctgt in correspondence with the target FC electric power Pfctgt. Further, the ECU 24 calculates the target oxygen concentration Cotgt in correspondence with the target FC current Ifctgt on the premise that the target FC voltage Vfctgt is at the reference voltage (see FIGS. 11 and 15). FIG. 15 shows the relationship between the target FC current Ifctgt and the target oxygen concentration Cotgt when the FC voltage Vfc is at the reference voltage v2.

At this time, depending on the target oxygen concentration Cotgt, the ECU 24 calculates, and sends instruction values to the respective components. The instruction values herein include the rotation number of the air pump 60 (hereinafter referred to as the "air pump rotation number Nap" or the "rotation number Nap"), the rotation number of the water pump 80 (hereinafter referred to as the "water pump rotation number Nwp" or the "rotation number Nwp"), and the opening degree of the back pressure valve 64 (hereinafter referred to as the "back pressure valve opening degree θbp" or the "opening degree θbp").

Figure 16:
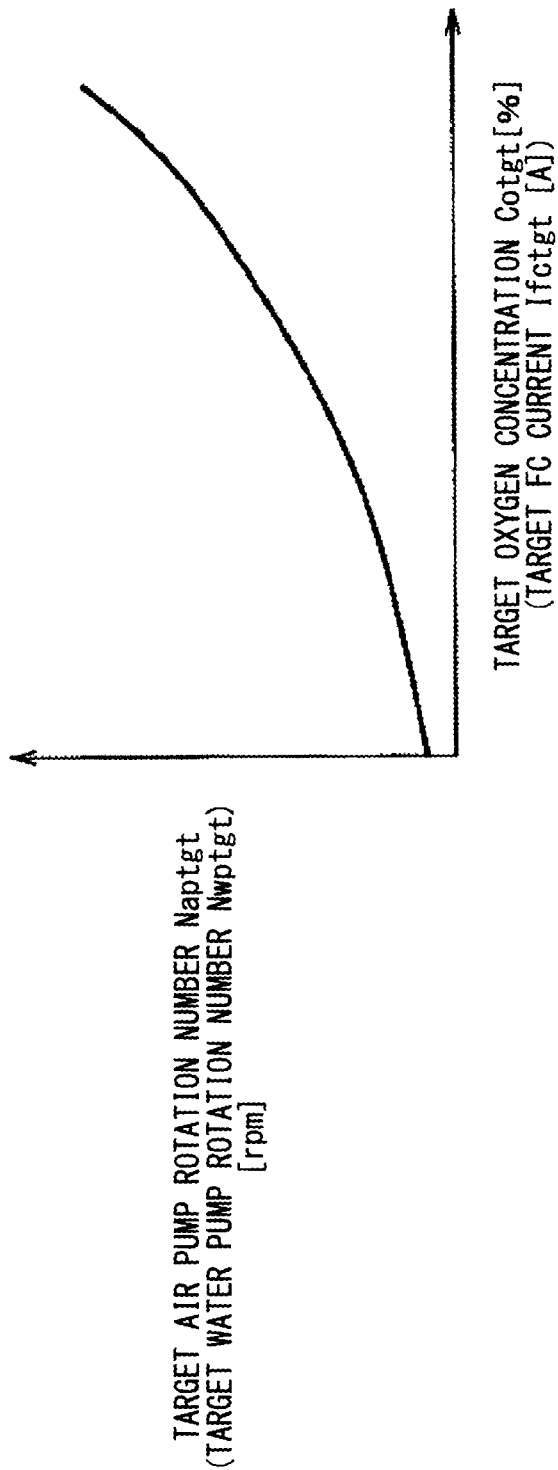
FIG. 16 is a graph showing the relationship between the target FC current, and the target air pump rotation number and the target water pump rotation number.
Figure 17:
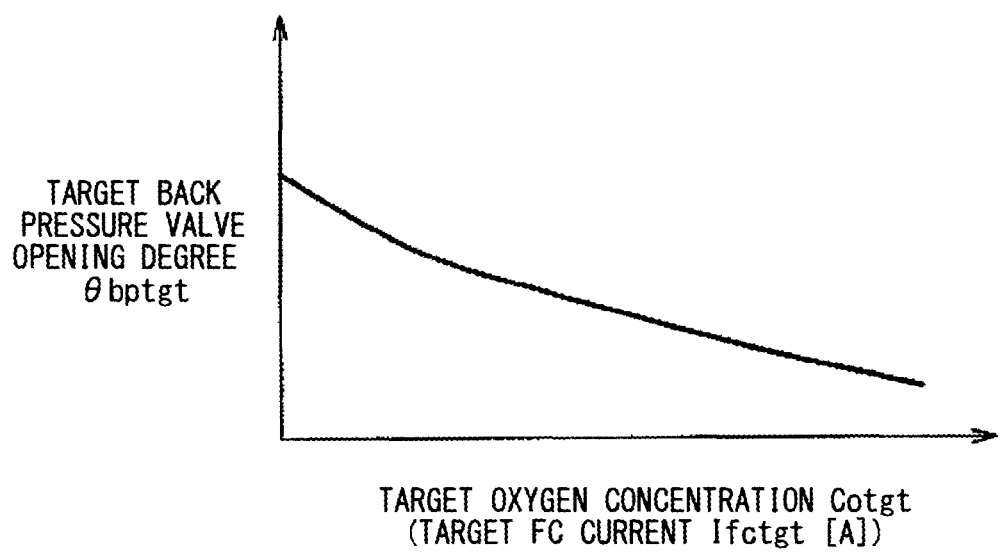
FIG. 17 is a graph showing the relationship between the target FC current, and the target opening degree of a back pressure valve.

That is, as shown in FIGS. 16 and 17, the target air pump rotation number Naptgt, the target water pump rotation number Nwptgt, and the target back pressure valve opening degree θbptgt are determined depending on the target oxygen concentration Cotgt.

In this manner, the mode B control in step S25 is implemented.

Then, in step S26, the ECU 24 determines whether power generation by the FC stack 40 is stably performed or not. In the determination, if the lowest cell voltage inputted from the cell voltage monitor 42 is lower than the voltage obtained by subtracting a predetermined voltage from the average cell voltage (lowest cell voltage<(average cell voltage−predetermined voltage)), the ECU 24 determines that power generation of the FC stack 40 is not stable. For example, measured values, simulation values or the like may be used as the predetermined voltage.

If power generation is stable (S26: YES), the current process is finished. If power generation is not stable (S26: NO), then in step S27, the ECU 24 increases the target oxygen concentration Cotgt by one stage (closer to normal concentration). Specifically, at least one of the control to increase the rotation number Nap of the air pump 60 and the control to decrease the opening degree θbp of the back pressure valve 64 is performed by one stage.

In step S28, the ECU 24 determines whether or not the target oxygen concentration Cotgt is less than the target oxygen concentration of the normal I-V characteristic (normal oxygen concentration Conml). If the target oxygen concentration Cotgt is less than the normal oxygen concentration Conml (S28: YES), the process returns to step S26. If the target oxygen concentration Cotgt is not less than the normal oxygen concentration Conml (S28: NO), in step S29, the ECU 24 stops operation of the FC unit 18. That is, the ECU 24 stops supply of hydrogen and air to the FC stack 40 thereby to stop power generation of the FC stack 40. Then, the ECU 24 turns on an alarming lamp (not shown) to notify the operator that there is a failure in the FC stack 40. It should be noted that the ECU 24 supplies electric power from the battery 20 to the motor 14 for allowing the FC vehicle 10 to continue running.

In the determination in step S24 as described above, if the target FC electric power Pfctgt is less than the threshold electric power Pthq (step S24:YES), mode C control is implemented in step S30. As shown in FIG. 13, the mode C control is mainly used when the system load Psys is relatively low. The target cell voltage Vcelltgt (=target FC voltage Vfctgt/ cell number) is fixed to the voltage (in the present embodiment, the voltage v3 (=0.9 V)) outside the oxidation reduction progress region R3, and the FC current Ifc is variable. The shortage of the FC electric power Pfc is assisted by the battery 20, and excessive electric power of the FC electric power Pfc is used for charging the battery 20.

In the mode C control, as shown in FIG. 13, the cell voltage Vcell is fixed to a constant level (Vcell=v3). In this state, the target oxygen concentration Cotgt is decreased thereby to decrease the oxygen concentration Co.

As shown in FIG. 11, as the cathode stoichiometric ratio (which is nearly equal to the oxygen concentration Co) decreases, the cell current Icell (FC current Ifc) is decreased. Thus, by increasing or decreasing the target oxygen concentration Cotgt while keeping the cell voltage Vcell at a constant level (Vcell=v3=0.9 V), it becomes possible to control the cell current Icell (FC current Ifc) and the FC electric power Pfc. The shortage of the FC electric power Pfc is assisted by the battery 20. Therefore, in the mode C control, the process in the same manner as the control process in the mode B control in step S25 as described above, and the process related to power generation stability in steps S26 to S29 are performed.

In this manner, basic power generation control according to FC power generation control of step S4 is implemented.

Figure 18:
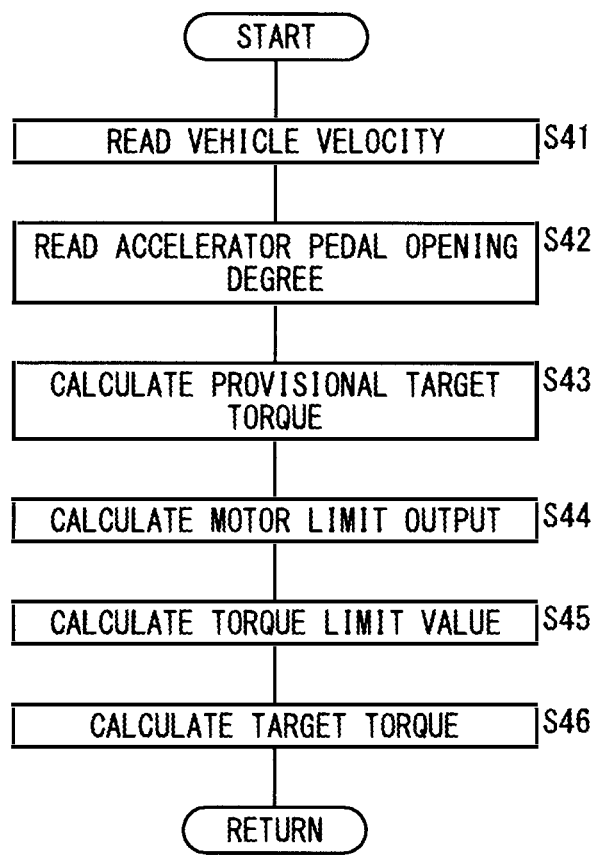
FIG. 18 is a flow chart showing torque control of the motor.

Next, FIG. 18 is a flow chart showing torque control of the motor 14 related to the process of step S5. In step S41, the ECU 24 reads vehicle velocity Vs from a vehicle velocity sensor 154. In step S42, the ECU 24 reads the opening degree θp of the accelerator pedal 156 from the opening degree sensor 150.

In step S43, the ECU 24 calculates a provisional target torque Ttgt_p [N·m] of the motor 14 based on the vehicle velocity Vs and the opening degree θp. Specifically, a map representative of the relationship between the vehicle velocity Vs, the opening degree θp, and the provisional target torque Ttgt_p is stored in a memory (not shown), and the target provisional torque Ttgt_p is calculated based on the map, the vehicle velocity Vs, and the opening degree θp.

In step S44, the ECU 24 calculates the limit output of the motor 14 (motor limit output Pm_lim) [W]. The motor limit output Pm_lim is equal to the limit value of electric power (limit supply electric power Ps_lim) [W] which can be supplied from the FC system 12 to the motor 14. Specifically, the limit supply electric power Ps_lim and the motor limit output Pm_lim are calculated by subtracting electric power Pa consumed by auxiliary devices from the sum of the FC electric power Pfc from the FC stack 40 and the limit value (limit output Pbat_lim) of electric power which can be supplied from the battery 20 (Pm_lim=Ps_lim←Pfc+Pbat_lim-Pa).

In step S45, the ECU 24 calculates the torque limit value Tlim [N·m] of the motor 14. Specifically, the torque limit value Tlim is calculated by dividing the motor limit output Pm_lim by the vehicle velocity Vs (Tlim←Pm_lim/Vs).

In step S46, the ECU 24 calculates the target torque Ttgt [N·m]. Specifically, the ECU 24 calculates the target torque Ttgt by setting a limitation of the torque limit value Tlim to the provisional target torque Ttgt_p. For example, in the case where the provisional target torque Ttgt_p is the torque limit value Tlim or less, (Ttgt_p≤Tlim), the provisional target torque Ttgt_p is directly used as the target torque Ttgt (Ttgt←Ttgt_p). In the case where the provisional target torque Ttgt_p exceeds the torque limit value Tlim (Ttgt_p>Tlim), the torque limit value Tlim is used as the target torque Ttgt (Ttgt←Tlim). The calculated target torque Ttgt is used to control the motor 14.

Figure 19:
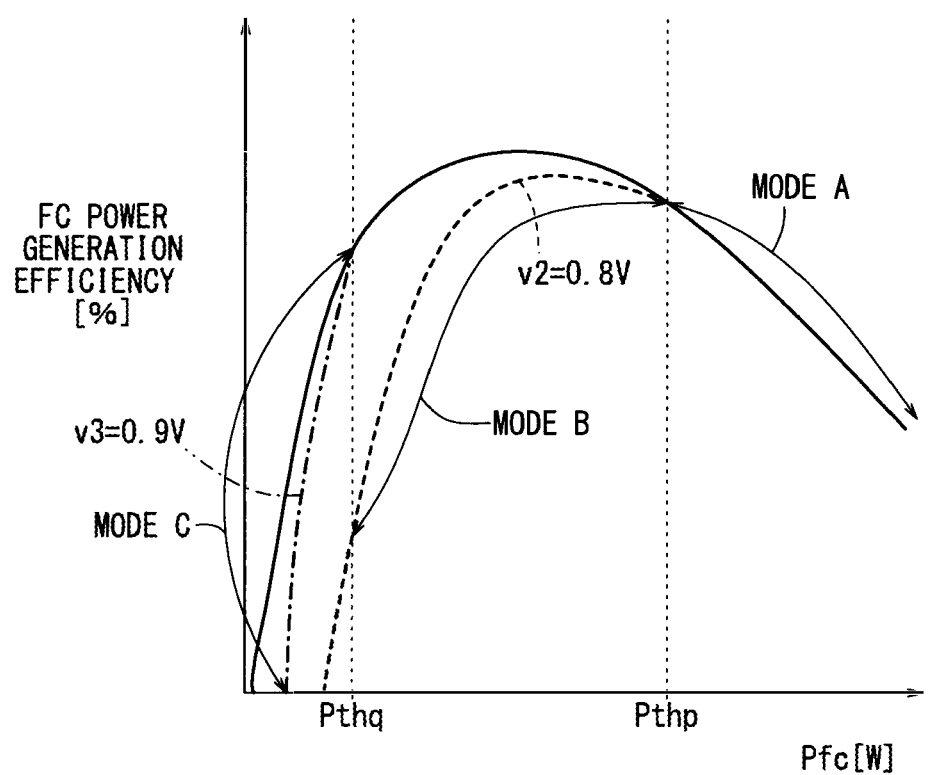
FIG. 19 is a graph showing the relationship between the power generation electric power and the power generation efficiency of the fuel cell.

FIG. 19 shows the relationship between the FC electric power Pfc and the power generation efficiency of the FC stack 40 in the mode A control, mode B control, and mode C control according to the above-described power supply mode. As can be seen from FIG. 19, in the mode A control, basically, the entire system load Psys is covered by the FC electric power Pfc, and the high power generation efficiency of the FC stack 40 is maintained. In the mode B control where the voltage is fixed to v2, the stoichiometric ratio (oxygen concentration) is low and variable, basically, by covering the entire system load Psys by the FC electric power Pfc, charging/discharging of the battery 20 occurs less frequently, and it is possible to improve the output efficiency in the entire FC system 12. In the mode C control, the system load Psys is covered by the FC electric power Pfc and the battery electric power Pbat.

Next, on the premise of the above basic control (mode A control, mode B control, and mode C control), the first and second embodiment will be described.

[First Embodiment]

In the above basic control, for example, in the case where the system load (system request load) Psys is high, the mode A control according to the normal I-V characteristic 162 at the voltage v2 (=0.8 V) or less in FIG. 13, related to the process of step S22 (FIG. 12) is implemented. That is, under the mode A control, the target FC voltage Vfctgt is variable, the cathode stoichiometric ratio (which is nearly equal to oxygen concentration) is normal, and the FC current Ifc is variable.

In this mode A control, the FC voltage Vfc is set by stepping up the primary voltage V1, i.e., the voltage Vbat of the battery 20, by the DC/DC converter 22 in FIG. 4.

Thus, in the mode A control implemented in the case where the system load (system request load) Psys is high, a switching loss occurs due to the voltage step-up switching (chopping) of the DC/DC converter 22.

More specifically, during the power supply mode for supplying electric power to the load 33, including the power running mode for supplying electric power from the battery 20 to the motor 14, for example, the DC/DC converter 22 is placed in a voltage step-up mode. In a first timing period of a constant cycle 2π, in FIG. 4, the gate drive signal UL is switched to the high level, whereby the lower arm switching element 116 is placed in the ON state. Further, the gate drive signal UH is switched to the low level, whereby the upper arm switching element 112 is placed in the OFF state. In this state (lower arm switching element 116: ON, upper arm switching element 112: OFF), energy (electric power) from the battery 20 is stored in the reactor 110. In this first timing period, electric power is supplied from a smoothing capacitor 128 to the load 33. Then, in the remaining period of the constant cycle 27*c* (second timing period), by switching the gate drive signal UL to the low level (lower arm switching element 116: OFF, upper arm switching element 112: OFF), the energy (electric power) stored in the reactor 110 and the electric power from the battery 20 are combined. Then, the combined electric power is supplied to the smoothing capacitor 128 through the reactor 110 and the diode 114, and supplied to the load 33.

As described above, the switching loss caused by switching operation of the DC/DC converter 22 is mainly a combination of an alternating current loss (due to heat emission) in the reactor 110, a loss caused when the lower arm switching element 116 is placed in the ON state, and a loss caused when the diode 114 is energized. By the switching loss, electric power consumption of the battery 20 is increased, and the system efficiency is lowered.

The first embodiment is aimed to eliminate the alternating current loss at the reactor 110 when the DC/DC converter 22 functions as a step-up voltage converter, and the switching loss of the lower arm switching element 116.

In order to eliminate the switching loss, in the first embodiment, in the DC/DC converter 22 shown in FIG. 4, electrical current (electric power) is supplied continuously from the battery 20 to the load 33 through the reactor 110 and the diode 114. That is, the DC/DC converter 22 is controlled as a so-called direct connection state. In the direct connection state, the ECU 24 switches both of the gate drive signal UH and the gate drive signal UL to the low level, and keeps both of the upper arm switching element 112 and the lower arm switching element 116 in the OFF state.

Figure 20:
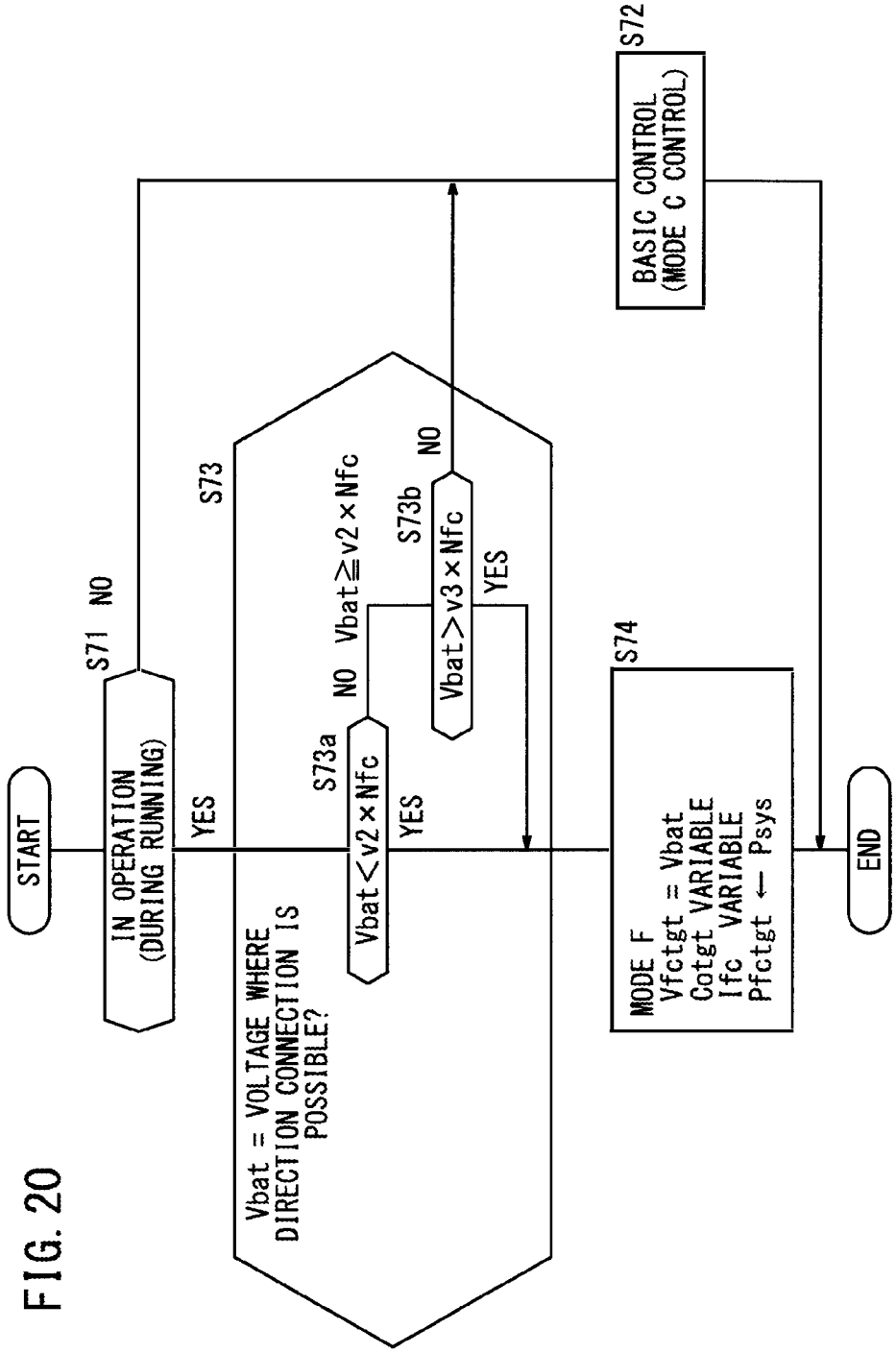
FIG. 20 is a flow chart illustrating operation of a first embodiment.

Based on the points described above, operation of the first embodiment (direct connection control) will be described with reference to a flow chart in FIG. 20.

In step S71, the ECU 24 determines whether or not the FC vehicle 10 is in operation (in the middle of running), based on the vehicle velocity Vs or the like.

If the FC vehicle 10 is not in operation (in the middle of running) (step S71: NO), in step S72, the basic control as described above is implemented. In the basic control, in step S72, since the system load (system request load) Psys is low, the mode B control (where the voltage is fixed to v2, the stoichiometric ratio (oxygen concentration) is low and variable) or the mode C control (where the voltage is fixed to v3, the stoichiometric ratio (oxygen concentration) is low and variable) is implemented.

If the FC vehicle 10 is in operation (in the middle of running) (step S71: YES), in step S73, it is determined whether or not the battery voltage Vbat between terminals of the battery 20 is at a level where the DC/DC converter 22 can be placed in the direct connection state (Vbat =direct-connectable voltage? (i.e., voltage at which a direct connection is possible?).

Specifically, in step S73$a$, it is determined whether or not the battery voltage Vbat is less than the lower limit voltage v2 of the oxidation reduction progress region R3×Nfc (Vbat<v2×Nfc). If the battery voltage Vbat is less than the lower limit voltage v2 of the oxidation reduction progress region R3×Nfc (step S73$a$: YES), it is determined that direct connection is possible.

In step S73$a$, if it is determined that the battery voltage Vbat is equal to or more than the lower limit voltage v2 of the oxidation reduction progress region R3×Nfc (step S73$a$: NO), then in step S73$b$, it is further determined whether or not the battery voltage Vbat is equal to or more than the upper limit voltage v3 of the oxidation reduction progress region R3×Nfc. If the battery voltage Vbat is the upper limit voltage v3 of the oxidation reduction progress region R3×Nfc or more (step S73$b$: YES), it is determined that direct connection is possible.

If the determination in step S73$b$ is negative (step S73$a$: No, and step S73$b$: NO), since the battery Vbat is within the oxidation reduction progress region R3 (v2 <Vbat <v3), direct connection would increase degradation D of the FC stack 40. Therefore, it is determined that direct connection is impossible, and basic control is implemented in step S72. The basic control in this case is the mode C control as described above.

If the determination in step S73 is affirmative (step S73: YES), since direct connection is possible, the ECU 24 implements a mode F control (direct connection control). In the mode F control, the ECU 24 sets the system load (system request load) Psys as the target FC electric power Pfctgt, and sets the battery voltage Vbat as the FC target voltage Vfctgt (Vfctgt=Vbat), and changes the target oxygen concentration Cotgt thereby to change the FC current Ifc.

Figure 21:
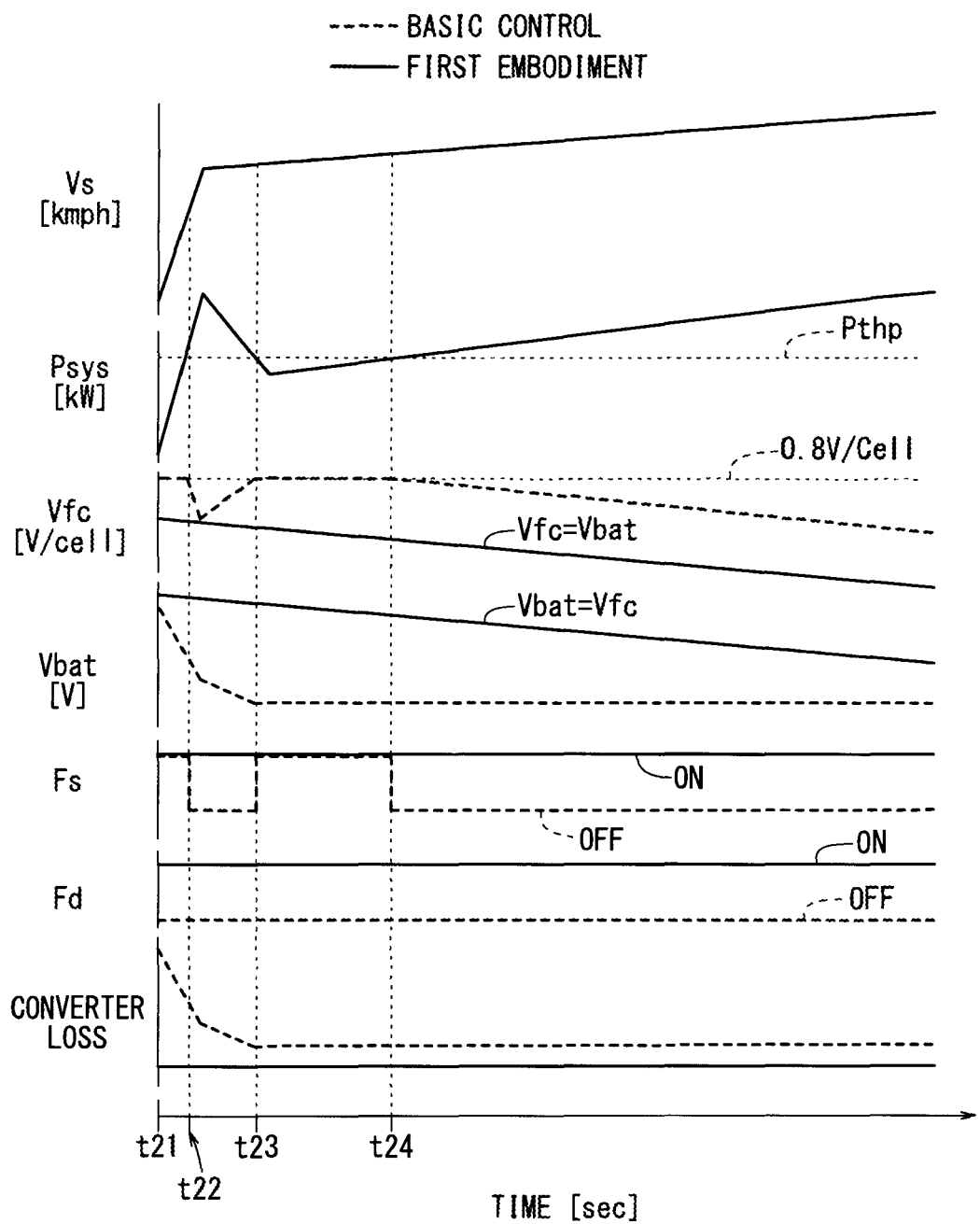
FIG. 21 is a time chart comparing, and illustrating the first embodiment and a technique according to basic control.

FIG. 21 shows a time chart in the case where the condition of step S73$a$ is satisfied, and the direct connection state is achieved (mode F control is implemented) from time t21. In FIG. 21, in portion of the time chart drawn below Vfc, characteristics drawn by thick broken lines denote change characteristics according to basic control, and characteristics drawn by thick solid lines denote change characteristics according to the first embodiment.

After time t21, in the basic control, a direct direction connection flag Fd is in an OFF state (Fd =OFF), and in the control according to the first embodiment, the direct connection flag Fd is in an ON state (Fd =ON). Therefore, after time t21, the battery 20 is in the direct connection state with respect to the load 33 and the FC stack 40 through the diode 114 (see FIG. 4). As a result, after time t21, the battery voltage Vbat is equal to the FC voltage Vfc (Vbat =Vfc). The voltage drop of the diode 114 is substantially offset by the voltage drop of the backflow prevention diode 98.

In the basic control (mode A control), during a period from time t22 to time 23 where the system load (system request load) Psys is the threshold electric power Pthp (see FIG. 13) or more, and after time t24, a low oxygen stoichiometric ratio variable operation flag Fs (which indicates that operation is performed in the state where the stoichiometric ratio (oxygen concentration) is low and variable) is placed in an OFF state, and basic control (mode A control) is implemented. In contrast, in the first embodiment, direct direction connection control is implemented over the entire period.

By implementing the direct connection control, among the loss of the DC/DC converter 22, an alternating current loss at the reactor 110 and a switching loss at the lower arm switching element 116 are eliminated. The entire loss decreases to a loss calculated by multiplying the forward voltage drop of the diode 114 by the battery current Ibat.

[Summary of the First Embodiment]

As described above, the fuel cell system 12 according to the first embodiment includes the FC stack 40 having catalyst, for generating electric power by inducing reaction of oxygen or hydrogen at the catalyst, a gas supply unit (fuel gas supply unit (hydrogen tank 44), oxygen-containing gas supply unit (air pump 60)) for supplying at least one of the oxygen and the hydrogen to the FC stack 40, the battery 20 (energy storage device) in which an output voltage changes depending on an amount of electric power stored in the battery 20, the DC/DC converter (voltage regulator) provided in parallel to the FC stack 40, and in series with the battery 20 for regulating the FC voltage Vfc of the FC stack 40, the load 33 driven by the electric power outputted from the FC stack 40, and the ECU 24 (control unit) for detecting the system electric power of the load 33 (system request electric power) Psys and controlling the FC stack 40, the gas supply unit, and the DC/DC converter 22.

In the case where the battery voltage Vbat of the battery 20 is outside the voltage range where oxidation-reduction reaction proceeds in the FC stack 40 (oxygen reduction progress region R3) (Vbat v2×Nfc or Vbat v3×Nfc), the ECU 24 controls the DC/DC converter 22 in the direct connection state (where the battery voltage Vbat of the battery 20 is nearly equal to the FC voltage Vfc of the FC stack 40 (Vbat≈Vfc), and controls the gas supply unit (fuel gas supply unit (hydrogen tank 44), the oxygen containing gas supply unit (air pump 60)) to regulate the concentration of oxygen or hydrogen supplied to the FC stack 40 in accordance with the target FC electric power Pfctgt determined based on the electric power required by the load 33 (i.e., the ECU 24 implements stoichiometric ratio variable control).

Since direct connection of the voltage (Vfc=Vbat) is implemented outside the oxidation reduction progress region R3, degradation of the FC stack 40 is prevented. Further, owing to the direct connection, the power loss related to the voltage step-up/step-down operation (switching) of the DC/DC converter 22 (switching loss) is eliminated. Thus, in the fuel cell vehicle 10 equipped with such a fuel cell system 12, power loss is reduced, and improvement in the system efficiency is achieved.

[Second Embodiment]

Figure 22:
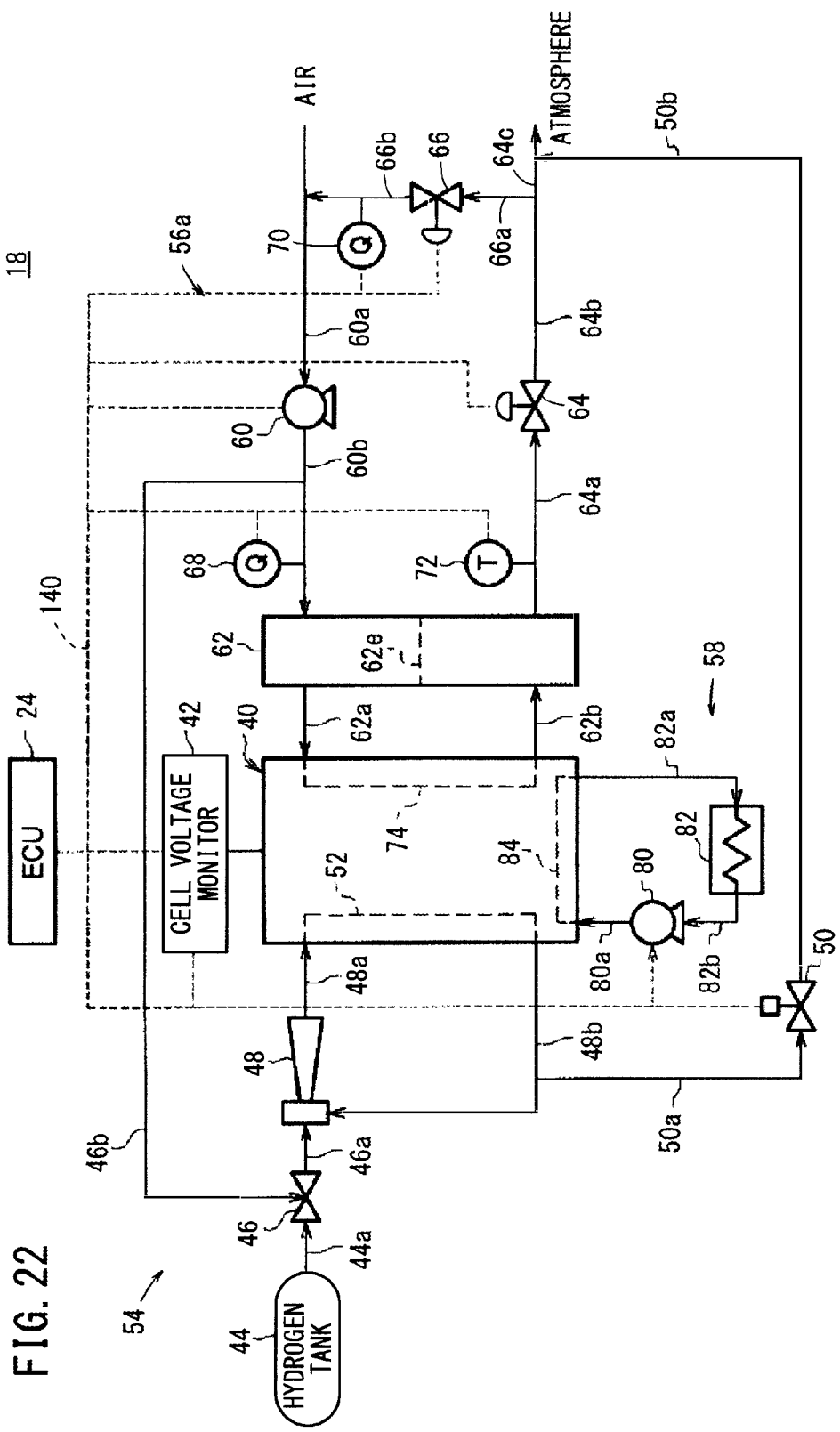
FIG. 22 is a diagram schematically showing a fuel cell unit according to a second embodiment.

FIG. 22 is a diagram schematically showing a structure of the FC unit 18 according to the second embodiment. In the FC unit 18 according to the second embodiment, in the cathode system 56a, a circulation valve (cathode circulation valve) 66 is included in addition to the air pump 60, the humidifier 62, and the back pressure valve 64.

In this case, the pipe 66a, the circulation valve 66, and the pipe 66b are connected between the pipe 64b on the output side of the back pressure valve 64 and the pipe 60a on the air intake side (input side). Thus, some of the exhaust gas (cathode off gas) is supplied as a circulating gas to the pipe 60a through the pipe 66a, the circulation valve 66, and the pipe 66b. The exhaust gas is mixed with the fresh air from the outside of the vehicle, and sucked into the air pump 60.

For example, the circulation valve 66 is a butterfly valve, and the opening degree of the butterfly valve (hereinafter referred to as the "circulation valve opening degree $\theta c$" or the "opening degree $\theta c$") is controlled by the ECU 24 to regulate the flow rate of the circulating gas. A flow rate sensor 70 is connected to the pipe 66b, and the flow rate sensor 70 detects the flow rate Qc [g/s] of the circulating gas flowing toward the pipe 60a, and outputs the detected flow rate to the ECU 24.

Figure 23:
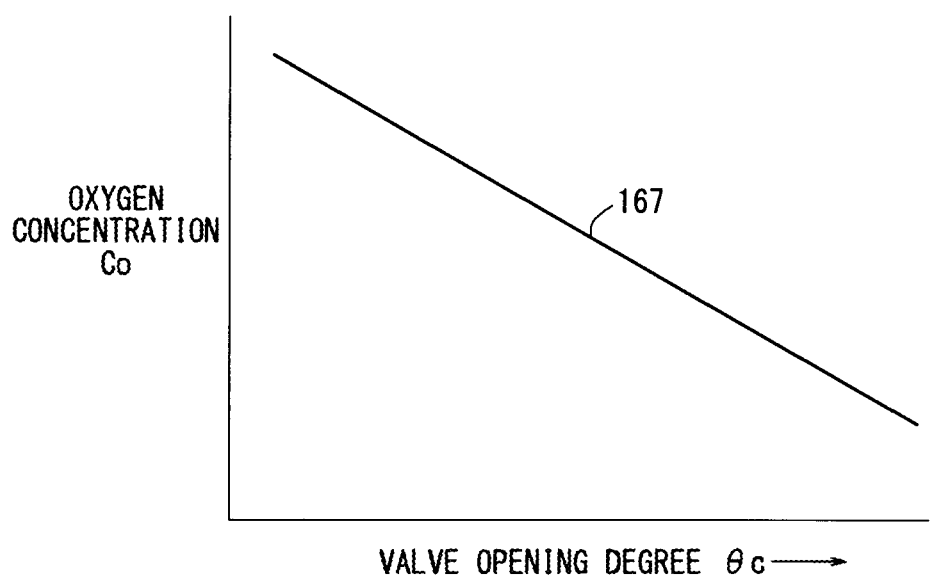
FIG. 23 is a graph showing the relationship between the valve opening degree of a circulation valve and the oxygen concentration in a cathode channel.

As shown in FIG. 23, with the increase in the valve opening degree $\theta c$ for allowing the exhaust gas to flow through the circulation valve 66, the oxygen concentration Co in the cathode channel 74 is decreased.

Thus, in the second embodiment, if the determination in step S73 is affirmative (step S73: YES), i.e., the direct connection is possible, then the ECU 24 implements the mode F control (direct connection control) by setting the system load Psys (system request load) of the FC stack 40 as the target FC electric power Pfctgt, regulating the battery voltage Vbat to the FC target voltage Vfctgt, and changing target oxygen concentration Cotgt thereby to change the FC current Ifc. At the time of implementing the mode F control, the ECU 24 only changes the opening degree $\theta c$ of the circulation valve 66 to change the FC current Ifc.

That is, in the second embodiment, at the time of implementing the mode F control (direct connection control), unlike the first embodiment, without changing the rotation number of the air pump 60 and the opening degree of the back pressure valve 64, only the opening degree $\theta c$ of the circulation valve 66 is changed thereby to change the FC current Ifc. Therefore, control can be simplified advantageously.

[Third Embodiment]

In the direct connection control according to the first embodiment and the second embodiment as described above, at the time of starting the direct connection control, if the SOC value of the battery 20 is high, and the battery voltage Vat is kept to have a high value, it is highly probable that the battery voltage Vbat is within the oxidation reduction progress region R3.

If direct connection is implemented when the battery voltage Vbat is within the oxidation reduction progress region R3, the FC stack 40 is degraded. Therefore, if the SOC value of the battery 20 is high, practically, direct connection should not be performed. However, if direct connection is prohibited, the DC/DC converter 22 has to be operated. That is, the converter loss is increased and the efficiency in the vehicle is lowered. In an attempt to address the problem, the third embodiment offers a structure for increasing the frequency of implementing the direct connection control as much as possible.

In this case, firstly, the SOC value of the battery 20 is controlled such that the battery voltage Vbat of the battery 20 becomes less than the oxidation reduction progress voltage v2×Nfc. Secondly, during the direct connection control, by performing the stoichiometric ratio variable control without performing switching operation of the DC/DC converter 22, reduction in the loss is achieved. Thirdly, for example, in order to achieve a desired running performance during hill climbing, and ensure electric power enough for restarting operation at low temperature, when the system load Psys (motor load mainly) is high, i.e., when the estimated electric power Pm [W] consumed by the motor 14 is large and the outside temperature is low, since it is highly probable that the electric power of the battery 20 is used, direct connection control is not implemented.

Figure 24:
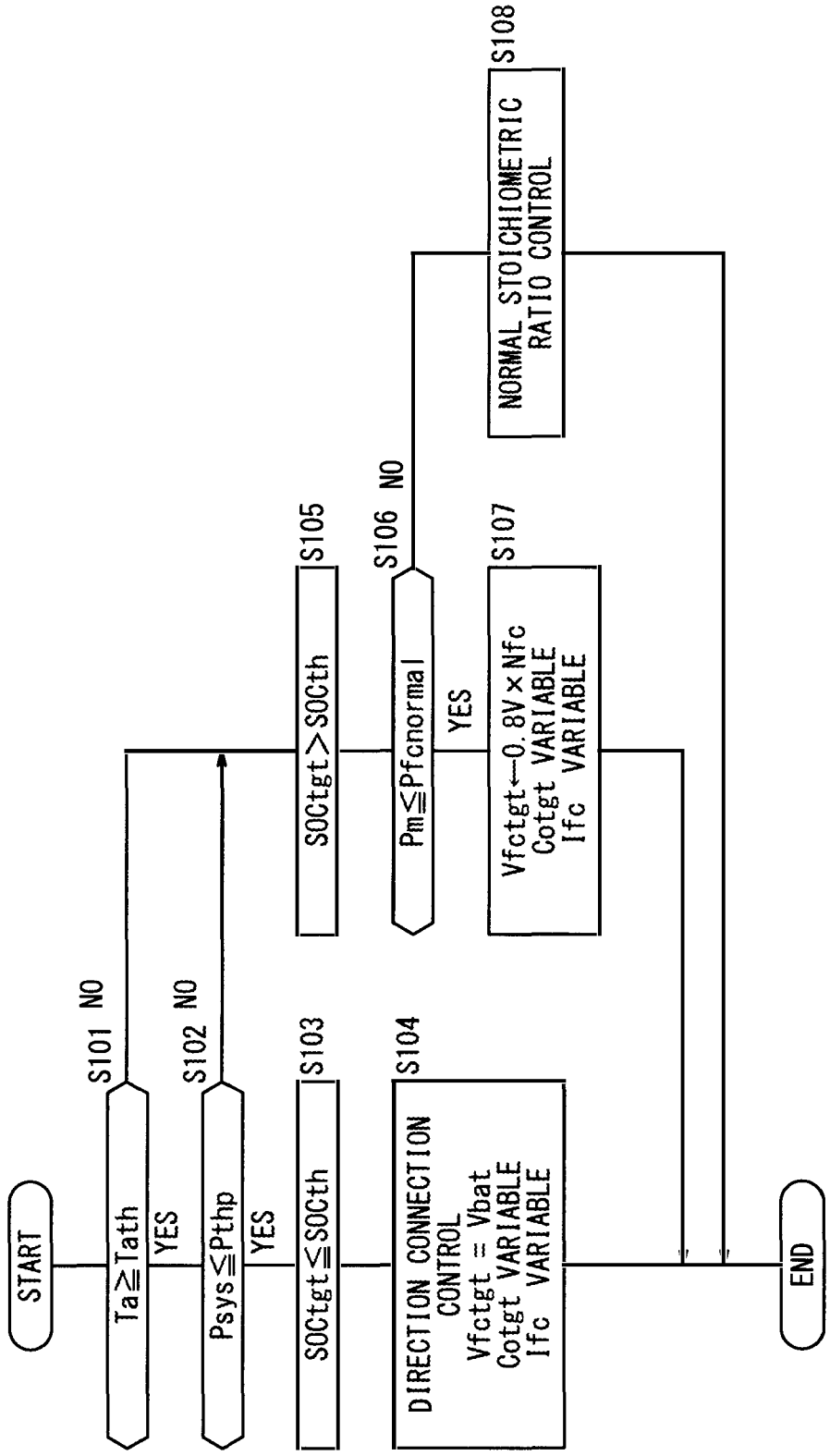
FIG. 24 is a flow chart illustrating operation of the second embodiment.

Operation of the third embodiment which takes the above first to thirst points into account will be described below with reference to a flow chart of FIG. 24.

In step S101, it is determined whether or not the outside temperature Ta detected by an outside temperature sensor 159 is a predetermined threshold temperature Tath or more. The threshold temperature Tath is set to a value suitable for the vehicle type. For example, the threshold temperature is about 0 [° C.] or less, about 10 [° C.] or less or substantially in a range between 0 [° C.] and 10 [° C.].

With decrease in the outside temperature Ta, energy required for warming up or the like at the time of restarting operation becomes larger. Therefore, a condition that the outside temperature Ta is a high temperature, i.e., the outside temperature Ta is the threshold temperature Tath or more, is defined as a premise condition for direct connection control according to the third embodiment.

If the determination in step S101 is affirmative, then in step S102, it is determined whether or not the system load Psys including the estimated motor power consumption Pm [W] is the threshold electric power Pthp [W] or less (see FIG. 13).

If the system load Psys (motor load mainly) is high, the system load Psys cannot be covered only by the FC stack 40. Therefore, shortage of the electric power has to be compensated by the electric power of the battery 20. Thus, a condition that the system load Psys (motor load mainly) is not significantly high is defined as a premise condition for the direct connection control according to the third embodiment.

If the determination in step S102 is affirmative, then in step S103, SOCtgt as the target SOC value of the battery 20 is controlled to be equal to or less than SOCth (which is a threshold SOC value corresponding to the lower limit voltage v2=0.8[V] of the cell voltage of the FC stack 40 in the oxidation reduction progress region R3).

Specifically, as can be seen from the characteristic 280 of FIG. 25, the battery voltage Vbat is set within a J region below the battery voltage v2×Nfc corresponding to the threshold value SOCth.

At this time, the DC/DC converter 22 is controlled in the direct connection state, and the battery voltage Vbat is set as the target FC voltage Vfctgt of the FC stack 40 (Vfctgt=Vbat).

Then, in the state where the DC/DC converter 22 is placed in the direct connection state under control, in step S104, the FC Ifc is controlled by changing the target oxygen concentration Cotgt in a range at or below the normal stoichiometric ratio thereby to change the oxygen concentration Co.

If the determination in step S101 or the determination in step S102 is negative, i.e., if the outside temperature Ta is higher than the threshold temperature Tath, or if the estimated power Pm [W] consumed by the motor 14 is high and the system load Psys is higher than the threshold electric power Pthp [W], step-up/step-down voltage control (switching control) is implemented without implementing the direct connection control of the DC/DC converter 22.

In this case, in step S105, SOCtgt as the target SOC value of the battery 20 is controlled by the DC/DC converter 22 so as to exceed SOCth as the threshold SOC value corresponding to the lower limit voltage v2=0.8[V] of the cell voltage of the FC stack 40 in the oxidation reduction progress region R3.

Figure 25:
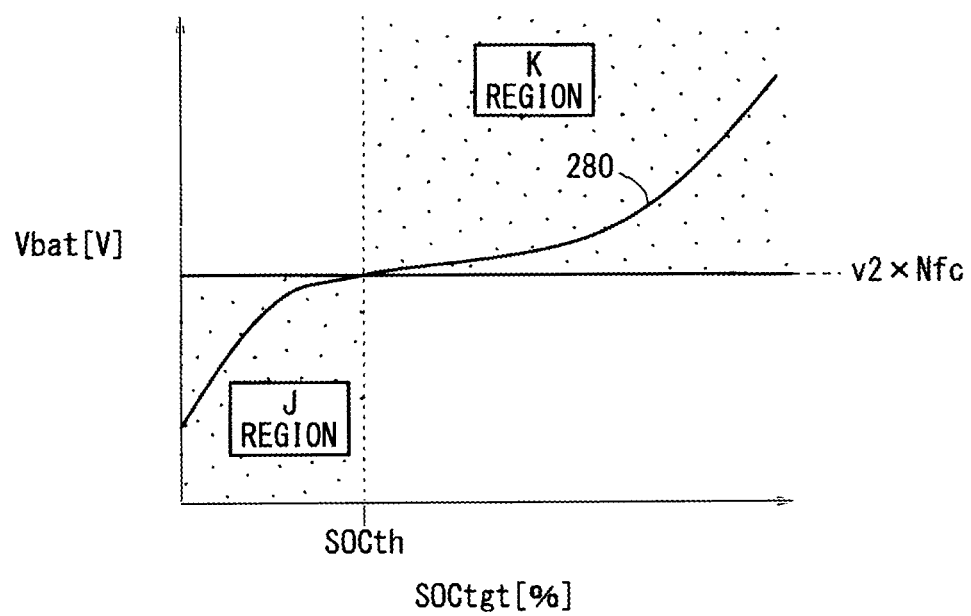
FIG. 25 is a graph showing the relationship between the target SOC value and the battery voltage in association with the fuel cell voltage.

Specifically, as can be seen from the characteristic 280 of FIG. 25, the battery voltage Vbat is set in a K region above v2×Nfc which is greater than the threshold value SOCth.

Then, in step S106, it is determined whether or not the estimated electric power Pm [W] consumed by the motor 14 (motor load) is equal to or less than the electric power Pfc-normal [W] which can be covered by the FC stack 40.

If the determination n step S106 is affirmative, in step S107, in a state where the cell voltage Vcell is kept constant (Vcell=v2), the FC current Ifc is controlled by changing the target oxygen concentration Cotgt in a range of the normal stoichiometric ratio or less thereby to change the oxygen concentration Co.

In this case, the electric power of the battery 20 is utilized to compensate for the shortage of electric power of the FC stack 40.

If the determination in step S106 is negative, variable control of the oxygen concentration Co in the range of the normal stoichiometric ratio or less is stopped. In step S108, the FC stack 40 is controlled at the normal stoichiometric ratio, and the electric power of the battery 20 is utilized to compensate for the shortage of the electric power of the FC stack 40.

Figure 26:
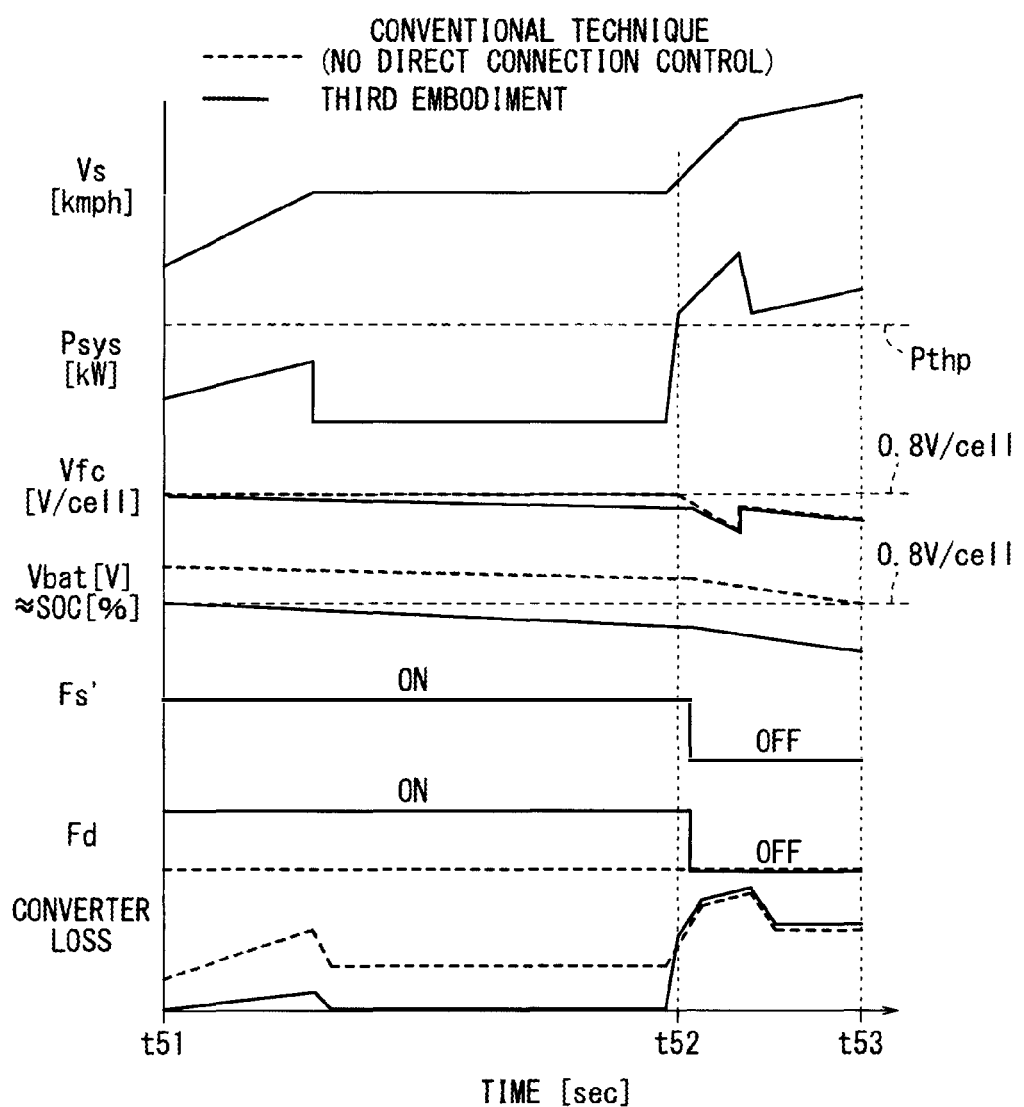
FIG. 26 is a time chart comparing, and illustrating a conventional technique and a third embodiment.

FIG. 26 is a time chart showing a case where direct connection control is implemented from time t51 to a point near time t52, and non-direct connection control (step-up voltage control by the DC/DC converter 22) is implemented from the point near time t52 to time t53. In FIG. 26, in portion of the time chart drawn below the FC voltage Vfc, characteristics drawn by thick broken lines denote change characteristics according to a conventional technique where no direct connection control is implemented, and characteristics drawn by thick solid lines denote change characteristics according to this third embodiment. By implementing the control of the third embodiment, in a case where the system load Psys is smaller than the threshold electric power Pthp, the direct connection state is achieved, and the switching loss at the DC/DC converter 22 is eliminated.

That is, in the period until the point near the time t52 where the determination in step S102 is negative (Psys Pthp), the direct connection flag Fd is in the ON state (Fd=ON), and the low oxygen stoichiometric ratio variable operation flag Fs' is in the ON state (Fs'=ON). Therefore, the target FC voltage Vfctgt of the FC stack 40 is equal to the battery voltage Vbat, and the FC stack 40 and the battery 20 are in the direct connection state (non-switching state). Since the DC/DC converter 22 is in the direct connection state, the converter loss is small in comparison with the conventional technique. The converter loss in the direct connection state is nearly equal to the electrical current passing through the diode 114× forward voltage drop of the diode 114.

When the system load Psys exceeds the threshold electric power Pthp at the point near the time t52, operation in the direct connection state is ended.

[Modified Examples]

The present invention is not limited to the above described embodiment. The present invention can adopt various structures based on the description herein. For example, the following structure may be adopted.

For example, in the above first to third embodiments, basically, the target power generation electric power Pfctgt is changed in accordance with the system load (system request load) Psys under control. However, the present invention is not limited in this respect. Alternatively, allocations of electric power outputted from the FC stack 40 and electric power outputted from the battery 20 are determined, and the control may be implemented as follows: Psys (system request electric power)←Pfctgt (target power generation electric power)+Pbattgt (target battery electric power). In this case, the rotation number Nap of the air pump 60 may be controlled in accordance with the target power generation electric power Pfctgt.

Though the FC system 12 is mounted in the FC vehicle 10 in the above described embodiment, the present invention is not limited in this respect. The FC system 12 may be mounted in other objects. For example, the FC system 12 may be used in movable objects such as ships or airplanes. Alternatively, the FC system 12 may be applied to household power systems.

Figure 27:
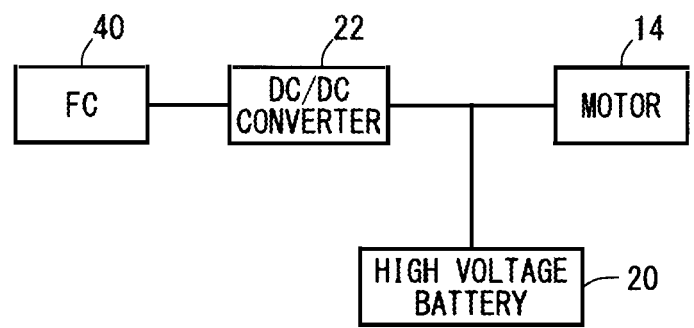
FIG. 27 is a block diagram schematically showing a structure of a first modified example of the fuel cell system.
Figure 28:
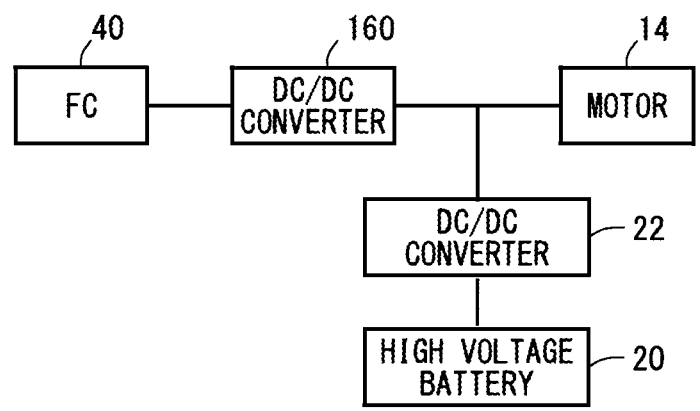
FIG. 28 is a block diagram schematically showing a structure of a second modified example of the fuel cell system.
Figure 29:
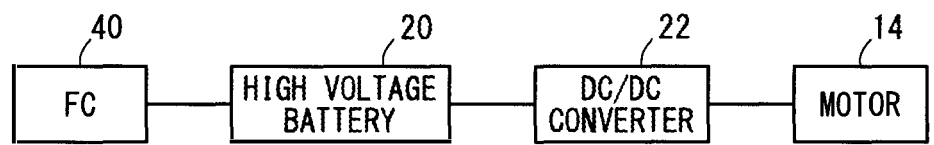
FIG. 29 is a block diagram schematically showing a structure of a third modified example of the fuel cell system.

In the above embodiment, the FC stack 40 and the high voltage battery 20 are arranged in parallel, and the DC/DC converter 22 is provided on the near side of the battery 20. However, the present invention is not limited in this respect. For example, as shown in FIG. 27, the FC stack 40 and the battery 20 may be provided in parallel, and a step-up, step-down, or step-up/step-down DC/DC converter 22 may be provided on the near side of the FC stack 40. Alternatively, as shown in FIG. 28, the FC stack 40 and the battery 20 may be provided in parallel, and a DC/DC converter 160 may be provided on the near side of the FC stack 40 and the DC/DC converter 22 may be provided on the near side of the battery 20. Alternatively, as shown in FIG. 29, the FC stack 40 and the battery 20 may be provided in series, and the DC/DC converter 22 may be provided between the battery 20 and the motor 14.

In the above described embodiment, a device or a method of adjusting the stoichiometric ratio is performed by adjusting the target oxygen concentration Cotgt. However, the present invention is not limited in this respect. Alternatively, target hydrogen concentration may be adjusted. Further, instead of the target concentration, the target flow rate, or both of the target concentration and the target flow rate may be adjusted.

In the above described embodiment, a structure including the air pump 60 for supplying air containing oxygen is illustrated. Alternatively or additionally, a structure including a hydrogen pump for supplying hydrogen may be adopted.

While the invention has been particularly shown and described with reference to preferred embodiments, it will be understood that variations and modifications can be effected thereto by those skilled in the art without departing from the spirit of the invention as defined by the appended claims.

What is claimed is:

1. A fuel cell system comprising:
   a fuel cell having catalyst, for performing power generation by inducing reaction of oxygen or hydrogen at the catalyst;

a gas supply unit for supplying at least one of the oxygen and the hydrogen to the fuel cell;

an energy storage device in which an output voltage thereof changes depending on an amount of electric power stored in the energy storage device;

a voltage regulator provided in parallel to the fuel cell, and in series with the energy storage device for regulating an output voltage of the fuel cell;

a load driven by electric power outputted from the fuel cell; and a means for detecting an electric power required by the load and controlling the fuel cell, the gas supply unit, and the voltage regulator to place the voltage regulator in a direct connection state and to regulate a concentration of the oxygen or the hydrogen supplied to the fuel cell in accordance with a target electric power for the power generation by the fuel cell determined based on the electric power required by the load when the output voltage of the energy storage device is outside a voltage range of the fuel cell where oxidation-reduction proceeds.

2. The fuel cell system according to claim 1, wherein the case where the output voltage of the energy storage device is outside the voltage range of the fuel cell where oxidation-reduction proceeds means that the output voltage is within a voltage range where reduction of the catalyst proceeds stably below the voltage range of the fuel cell where oxidation-reduction proceeds, or within a voltage range where oxidation of the catalyst proceeds stably above the voltage range of the fuel cell where oxidation-reduction proceeds.

3. The fuel cell system according to claim 2, further comprising an outside temperature sensor for measuring an outside temperature, wherein if the outside temperature measured by the outside temperature sensor is a threshold temperature or more, the means for detecting and controlling controls the voltage regulator to be placed in the direct connection state at a voltage within the voltage range where reduction of the catalyst proceeds stably.

4. The fuel cell system according to claim 3, wherein, when the electric power required by the load is high, the control unit regulates the output voltage of the fuel cell by the voltage regulator, and when the electric power required by the load is low, the control unit controls the voltage regulator to be placed in the direct connection state.

5. The fuel cell system according to claim 4, wherein at the time of controlling the voltage regulator to be placed in the direct connection state, the control unit controls a target state of charge value of the energy storage device to a threshold state of charge value or less, the threshold state of charge value corresponding to a lower limit voltage of the voltage range where oxidation-reduction proceeds.

6. The fuel cell system according to claim 1, wherein the voltage regulator is a DC/DC converter comprising an upper arm element and a lower arm element and a reactor, the upper arm element and the lower arm element each including a diode connected in parallel to a switching element in a reverse direction; and at the time of controlling the voltage regulator to be placed in the direct connection state, the control unit disables switching of the switching elements thereby to supply electric power from the energy storage device to the load through the reactor and the diode and to supply electric power from the fuel cell to the load.

7. A fuel cell vehicle equipped with a fuel cell system, and including a motor driven by electric power outputted from a fuel cell, the fuel cell system comprising:

the fuel cell having catalyst, for performing power generation by inducing reaction of oxygen or hydrogen at the catalyst;

a gas supply unit for supplying at least one of the oxygen and the hydrogen to the fuel cell;

an energy storage device in which an output voltage thereof changes depending on an amount of electric power stored in the energy storage device;

a voltage regulator provided in parallel to the fuel cell, and in series with the energy storage device for regulating an output voltage of the fuel cell; and a means for detecting an electric power required by the load and controlling the fuel cell, the gas supply unit, and the voltage regulator to place the voltage regulator in a direct connection state and to regulate a concentration of the oxygen or the hydrogen supplied to the fuel cell in accordance with a target electric power for the power generation by the fuel cell determined based on the electric power required by the load when the output voltage of the energy storage device is outside a voltage range of the fuel cell where oxidation-reduction proceeds.

* * * * *